US012370791B2

(12) United States Patent
Takabe et al.

(10) Patent No.: US 12,370,791 B2
(45) Date of Patent: Jul. 29, 2025

(54) LIQUID DISCHARGE DEVICE AND SYSTEM

(71) Applicant: SEIKO EPSON CORPORATION, Tokyo (JP)

(72) Inventors: Motoki Takabe, Shiojiri (JP); Yu Shiozawa, Shiojiri (JP); Masaki Mori, Shiojiri (JP); Hitoshi Takaai, Azumino (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 18/184,137

(22) Filed: Mar. 15, 2023

(65) Prior Publication Data

US 2023/0294395 A1 Sep. 21, 2023

(30) Foreign Application Priority Data

Mar. 16, 2022 (JP) ................................ 2022-041093

(51) Int. Cl.
*B41J 2/045* (2006.01)
*B41J 2/125* (2006.01)
*B41J 2/14* (2006.01)

(52) U.S. Cl.
CPC ......... *B41J 2/0451* (2013.01); *B41J 2/04563* (2013.01); *B41J 2/125* (2013.01); *B41J 2/14233* (2013.01); *B41J 2002/14241* (2013.01)

(58) Field of Classification Search
CPC ...... B41J 2/0451; B41J 2/04563; B41J 2/125; B41J 2/14233; B41J 2002/14241; B41J 2/04555; B41J 2/04581; B41J 2202/18; B41J 2002/14362; B41J 2002/14419; B41J 2002/14491; B41J 2/045; B41J 2/04553
See application file for complete search history.

(56) References Cited

U.S. PATENT DOCUMENTS

2014/0240405 A1* 8/2014 Furuya .................... B41J 2/055 310/365

FOREIGN PATENT DOCUMENTS

JP 2009-066948 A 4/2009
WO WO-2005041316 A1 * 5/2005 .......... B41J 2/14274

* cited by examiner

*Primary Examiner* — Justin Seo
(74) *Attorney, Agent, or Firm* — WORKMAN NYDEGGER

(57) ABSTRACT

A liquid discharge device has a liquid discharge head that includes a pressure chamber substrate provided with a first pressure chamber in which a liquid is accommodated, a first piezoelectric body provided to correspond to the first pressure chamber, and a detection resistor for detecting a temperature in a vicinity of the first pressure chamber, and a decision section that decides a degree of deterioration of the first piezoelectric body based on a detection result of the detection resistor.

15 Claims, 18 Drawing Sheets

LIQUID DISCHARGE DEVICE AND SYSTEM

The present application is based on, and claims priority from JP Application Serial Number 2022-041093, filed Mar. 16, 2022, the disclosure of which is hereby incorporated by reference herein in its entirety.

BACKGROUND

1. Technical Field

The present disclosure relates to a liquid discharge device and a system.

2. Related Art

A liquid discharge head of a liquid discharge device, such as a piezo ink jet printer, has a pressure chamber in which a liquid, such as ink, is accommodated and a piezoelectric body for applying pressure to the liquid in the pressure chamber. It is known that the displacement amount of the piezoelectric body decreases, that is, the piezoelectric body deteriorates when the piezoelectric body is repeatedly driven. For example, JP-A-2009-066948 discloses a liquid discharge device that corrects a voltage of a drive signal to be applied to a piezoelectric body based on the number of times of discharge of the liquid.

However, in the above-described technology according to the related art, the degree of deterioration of the piezoelectric body cannot be specified only by the number of times of discharge and varies due to the manufacturing error of the piezoelectric body, the temperature of the piezoelectric body, and the like. Therefore, there is a case where the number of times of discharge does not accurately reflect the degree of deterioration of the piezoelectric body.

SUMMARY

According to an aspect of the present disclosure, there is provided a liquid discharge device including a liquid discharge head that includes a pressure chamber substrate provided with a first pressure chamber in which a liquid is accommodated, a first piezoelectric body provided to correspond to the first pressure chamber, and a detection resistor for detecting a temperature in a vicinity of the first pressure chamber, and a decision section that decides a degree of deterioration of the first piezoelectric body based on a detection result of the detection resistor.

According to another aspect of the present disclosure, there is provided a system including a liquid discharge device that discharges a liquid, and a server that is connected to the liquid discharge device, in which the liquid discharge device includes a liquid discharge head that includes a pressure chamber substrate provided with a first pressure chamber in which a liquid is accommodated, a first piezoelectric body provided to correspond to the first pressure chamber, and a detection resistor for detecting a temperature in a vicinity of the first pressure chamber, and a communication device that transmits detection information indicating a detection result of the detection resistor to the server, and the server includes a decision section that decides a degree of deterioration of the first piezoelectric body based on the detection result indicated by the detection information, and a communication device that transmits information indicating a decision result decided by the decision section to the liquid discharge device.

DESCRIPTION OF EXEMPLARY EMBODIMENTS

Hereinafter, embodiments for carrying out the present disclosure will be described with reference to the accompanying drawings. However, in each drawing, the dimension and scale of each section are appropriately different from the actual ones. In addition, since the embodiments described below are preferred specific examples of the present disclosure, various technically preferable limitations are attached, but the scope of the present disclosure is not limited to the embodiments unless otherwise stated to specifically limit the present disclosure in the following description.

1. First Embodiment

1.1. Outline of Liquid Discharge Device

Figure 1:
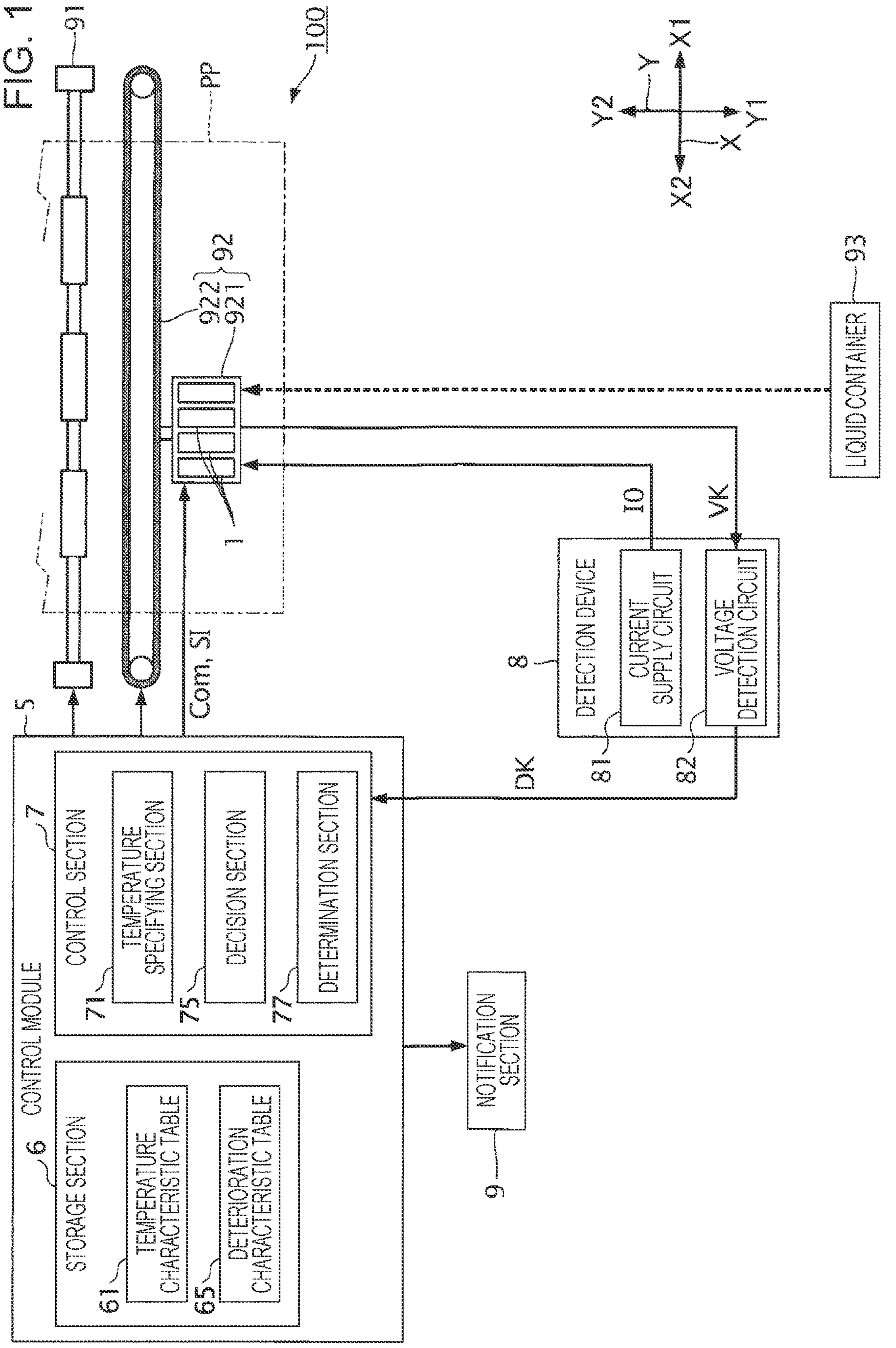
FIG. 1 is a schematic diagram illustrating a liquid discharge device according to a first embodiment.

FIG. 1 is a schematic diagram illustrating a liquid discharge device 100 according to a first embodiment. The liquid discharge device 100 is an ink jet printing device that discharges ink onto a medium PP. The medium PP is typically printing paper, but any print object, such as a resin film or fabric, can be used as the medium PP.

The liquid discharge device 100 includes a liquid container 93 that stores ink. As the liquid container 93, for example, a cartridge that can be attached to and detached from the liquid discharge device 100, a bag-shaped ink pack formed of a flexible film, or an ink tank that can be replenished with ink can be employed. A plurality of types of ink with different colors are stored in the liquid container 93.

The liquid discharge device 100 includes a plurality of liquid discharge heads 1, a control module 5, a detection device 8, a notification section 9, a moving mechanism 91, and a transport mechanism 92.

The control module 5 includes, for example, a control section 7 such as a CPU or FPGA and a storage section 6 such as a semiconductor memory, and controls each element of the liquid discharge device 100. Here, the CPU is an abbreviation for Central Processing Unit, and the FPGA is an abbreviation for Field Programmable Gate Array. The storage section 6 stores various programs and various data. Further, the storage section 6 has a temperature characteristic table 61 and a deterioration characteristic table 65. The temperature characteristic table 61 and the deterioration characteristic table 65 will be described later.

The moving mechanism 91 transports the medium PP in a Y1 direction along a Y axis under the control of the control section 7. Hereinafter, the Y1 direction and a Y2 direction opposite to the Y1 direction are collectively referred to as a Y axis direction. In addition, hereinafter, an X1 direction along an X axis that intersects the Y axis and an X2 direction opposite to the X1 direction are collectively referred to as an X axis direction. In addition, hereinafter, a Z1 direction along a Z axis that intersects the X axis and the Y axis and a Z2 direction opposite to the Z1 direction are collectively referred to as a Z axis direction. In the present embodiment, as an example, description will be performed while assuming that the X axis, the Y axis, and the Z axis are orthogonal to each other. However, the present disclosure is not limited to such an aspect. The X axis, the Y axis, and the Z axis may intersect each other.

The transport mechanism 92 reciprocates the plurality of liquid discharge heads 1 in the X1 direction and the X2 direction under the control of the control section 7. The transport mechanism 92 includes a storage case 921 that accommodates the plurality of liquid discharge heads 1, and an endless belt 922 to which the storage case 921 is fixed. The liquid container 93 may be stored in the storage case 921 together with the liquid discharge head 1.

The control section 7 controls a discharge operation from the liquid discharge head 1. Specifically, the control section 7 supplies, with respect to the liquid discharge head 1, a drive signal Com for driving the liquid discharge head 1 and a control signal SI for controlling the liquid discharge head 1. The liquid discharge head 1 is driven by the drive signal Com under the control of the control signal SI to discharge the ink in the Z1 direction from some or all of a plurality of nozzles N provided in the liquid discharge head 1. That is, the liquid discharge head 1 causes the ink to be discharged from some or all of the plurality of nozzles N in conjunction with the transportation of the medium PP by the moving mechanism 91 and the reciprocation of the liquid discharge head 1 by the transport mechanism 92, and causes the discharged ink to land on the surface of the medium PP, thereby executing a printing process for forming a desired image on the surface of the medium PP. The nozzles N will be described later with reference to FIGS. 2 and 3.

The detection device 8 includes a current supply circuit 81 and a voltage detection circuit 82.

The current supply circuit 81 supplies a current I0 to the liquid discharge head 1. In the present embodiment, the current I0 is a constant current of a predetermined magnitude. In addition, in the present embodiment, a case is assumed in which some or all of the current I0 supplied from the current supply circuit 81 to the liquid discharge head 1 flows from one end of the detection resistor TK provided in the liquid discharge head 1 to the other end. The detection resistor TK will be described later with reference to FIGS. 4, 6, and 7.

A voltage detection circuit 82 detects a voltage VK applied to the detection resistor TK. Here, the voltage VK is the potential difference between one end of the detection resistor TK and the other end. Specifically, in the present embodiment, the voltage detection circuit 82 detects the voltage VK at both ends of the detection resistor TK when some or all of the current I0 supplied from the current supply circuit 81 flows from one end of the detection resistor TK to the other end. The voltage detection circuit 82 outputs a detection result signal DK having a value corresponding to the voltage VK detected from the detection resistor TK to the control section 7. The value corresponding to the voltage VK is, for example, a value indicating the voltage VK. The detection result signal DK is an example of a "detection result".

In the present embodiment, description is performed by illustrating an aspect in which the current supply circuit 81 and the voltage detection circuit 82 are provided outside the liquid discharge head 1. However, the present disclosure is not limited to the aspect. The current supply circuit 81 and the voltage detection circuit 82 may be provided in the liquid discharge head 1.

The control section 7 can function as a temperature specifying section 71, a decision section 75, and a determination section 77. The temperature specifying section 71, the decision section 75, and the determination section 77 will be described later.

Under the control of the control section 7, the notification section 9 notifies a user of the liquid discharge device 100 of some information. For example, the notification section 9 is, for example, a display device or a sound emitting device. The display device is, for example, an organic EL display, an LED display, and an LCD. EL is an abbreviation for Electro-Luminescence. LED is an abbreviation for Light Emitting Diode. LCD is an abbreviation for Liquid Crystal Display. The sound emitting device is, for example, a speaker. When the notification section 9 is the display device, the display device displays an image indicating some information. When the notification section 9 is the sound emitting device, the sound emitting device emits a sound indicating some information.

1.2. Outline of Liquid Discharge Head

The outline of the liquid discharge head 1 will be described below with reference to FIGS. 2 and 3.

Figure 2:
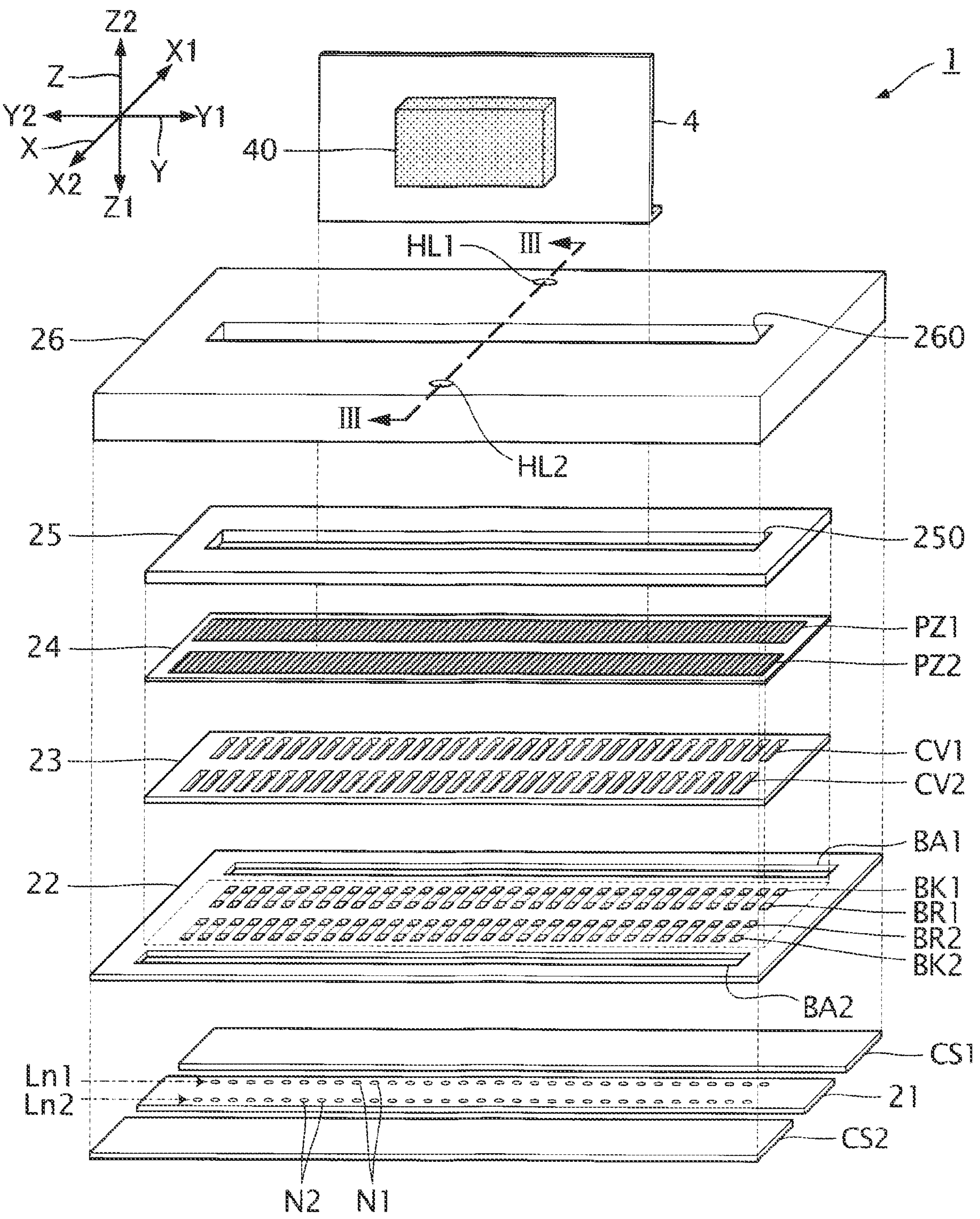
FIG. 2 is an exploded perspective view of a liquid discharge head.

FIG. 2 is an exploded perspective view of the liquid discharge head 1. FIG. 3 is a cross-sectional view taken along line III-III in FIG. 2.

Figure 3:
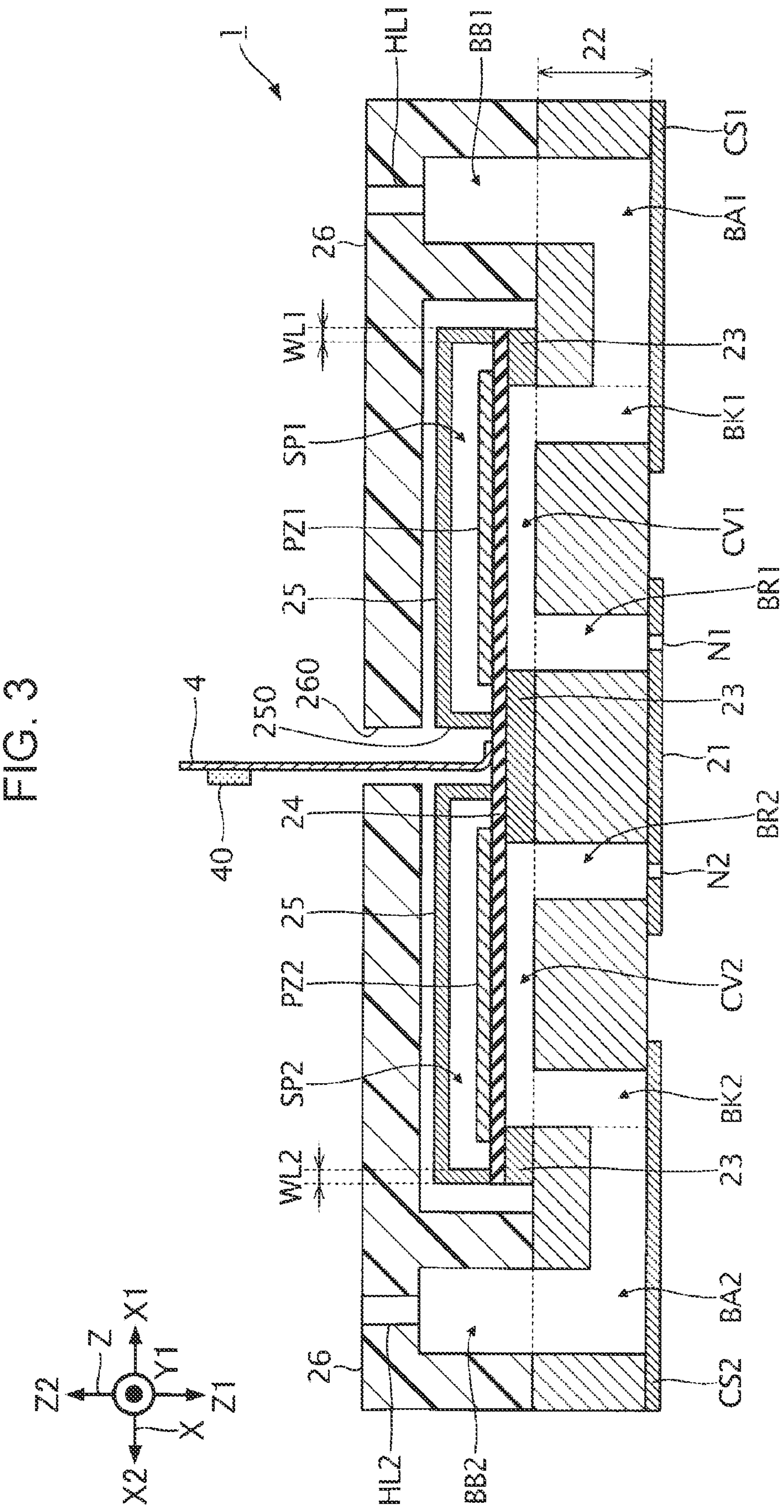
FIG. 3 is a cross-sectional view taken along line III-III in FIG. 2.

As shown in FIGS. 2 and 3, the liquid discharge head 1 includes a nozzle substrate 21, compliance sheets CS1 and CS2, a communication plate 22, a pressure chamber substrate 23, a diaphragm 24, a sealing substrate 25, a flow path forming substrate 26 and a wiring substrate 4.

As shown in FIG. 2, the nozzle substrate 21 is a plate-like member elongated in the Y axis direction and extending substantially parallel to an XY plane. Here, "substantially parallel" is a concept that includes not only a case of being completely parallel but also a case of being considered to be parallel when an error is considered. In the present embodiment, "substantially parallel" is a concept that includes a case where it can be regarded as parallel when an error of about 10% is considered. The nozzle substrate 21 is manufactured, for example, by processing a silicon single crystal substrate using a semiconductor manufacturing technology such as etching, but any known material and manufacturing method may be employed to manufacture the nozzle substrate 21.

The plurality of nozzles N are formed in the nozzle substrate 21. Here, the nozzle N is a through hole provided in the nozzle substrate 21. In the present embodiment, a case is assumed in which the plurality of nozzles N formed in the nozzle substrate 21 include a plurality of nozzles N1 arranged to extend in the Y axis direction, and a plurality of nozzles N2 arranged to extend in the Y axis direction at a position in the X2 direction when viewed from the plurality of nozzles N1. Hereinafter, the plurality of nozzles N1 extending in the Y axis direction are referred to as a nozzle row Ln1, and the plurality of nozzles N2 extending in the Y axis direction are referred to as a nozzle row Ln2. Moreover, below, the nozzle row Ln1 and the nozzle row Ln2 may be collectively referred to as a nozzle row Ln.

As shown in FIGS. 2 and 3, the communication plate 22 is provided at a position in the Z2 direction when viewed from the nozzle substrate 21. The communication plate 22 is a plate-like member elongated in the Y axis direction and extending substantially parallel to the XY plane. The communication plate 22 is manufactured, for example, by processing a silicon single crystal substrate using semiconductor manufacturing technology, but any known material and manufacturing method may be employed to manufacture the communication plate 22.

Ink flow paths are formed in the communication plate 22. Specifically, the communication plate 22 is formed with one supply flow path BA1 provided to extend in the Y axis direction, and one supply flow path BA2 provided to extend in the Y axis direction at a position in the X2 direction when viewed from the supply flow path BA1. In addition, the communication plate 22 is formed with a plurality of coupling flow paths BK1 corresponding to the plurality of nozzles N1, a plurality of coupling flow paths BK2 corresponding to the plurality of nozzles N2, a plurality of communication flow paths BR1 corresponding to the plurality of nozzles N1, and a plurality of communication flow paths BR2 corresponding to the plurality of nozzles N2.

Of these, the coupling flow path BK1 is provided to communicate with the supply flow path BA1 and extend in the Z axis direction at a position in the X2 direction when viewed from the supply flow path BA1. The communication flow path BR1 is provided to extend in the Z axis direction at a position in the X2 direction when viewed from the coupling flow path BK1. The communication flow path BR1 communicates with the nozzle N1 corresponding to the communication flow path BR1. The coupling flow path BK2 is provided to communicate with the supply flow path BA2 and extend in the Z axis direction at a position in the X1 direction when viewed from the supply flow path BA2. The communication flow path BR2 is provided to extend in the Z axis direction at a position in the X1 direction when viewed from the coupling flow path BK2 and at a position in the X2 direction when viewed from the communication flow path BR1. The communication flow path BR2 communicates with the nozzle N2 corresponding to the communication flow path BR2.

Hereinafter, the supply flow path BA1 and supply flow path BA2 may be collectively referred to as a supply flow path BA. Hereinafter, the coupling flow path BK1 and the coupling flow path BK2 may be collectively referred to as a coupling flow path BK. Hereinafter, the communication flow path BR1 and the communication flow path BR2 may be collectively referred to as a communication flow path BR.

As shown in FIGS. 2 and 3, the pressure chamber substrate 23 is provided at a position in the Z2 direction when viewed from the communication plate 22. The pressure chamber substrate 23 is a plate-like member elongated in the Y axis direction and extending substantially parallel to the XY plane. The pressure chamber substrate 23 is manufactured, for example, by processing a silicon single crystal substrate using semiconductor manufacturing technology, but any known material and manufacturing method may be employed to manufacture the pressure chamber substrate 23.

Ink flow paths are formed in the pressure chamber substrate 23. Specifically, the pressure chamber substrate 23 is formed with a plurality of pressure chambers CV1 corresponding to the plurality of nozzles N1 and a plurality of pressure chambers CV2 corresponding to the plurality of nozzles N2. Of these, the pressure chamber CV1 is provided to couple an end portion of the coupling flow path BK1 in the X2 direction and an end portion of the communication flow path BR1 in the X1 direction when viewed in the Z axis direction, and extend in the X axis direction. When viewed in the Z axis direction, the pressure chamber CV2 is provided to couple an end portion of the coupling flow path BK2 in the X1 direction and an end portion of the communication flow path BR2 in the X2 direction, and extend in the X axis direction. Hereinafter, the pressure chamber CV1 and the pressure chamber CV2 may be collectively referred to as a pressure chamber CV.

As shown in FIGS. 2 and 3, the diaphragm 24 is provided at a position in the Z2 direction when viewed from the pressure chamber substrate 23. The diaphragm 24 is a plate-like member elongated in the Y axis direction and extending substantially parallel to the XY plane, and is a member capable of elastic vibration. In the present embodiment, a surface in the Z2 direction, in the two surfaces of the diaphragm 24 whose normal direction is the Z axis direction, is formed of a non-conductive member. Specifically, the diaphragm 24 has an elastic layer formed of silicon oxide and an insulating layer made of zirconium oxide provided at a position in the Z2 direction when viewed from the elastic layer.

As shown in FIGS. 2 and 3, a plurality of piezoelectric elements PZ1 corresponding to the plurality of pressure chambers CV1 and a plurality of piezoelectric elements PZ2 corresponding to the plurality of pressure chambers CV2 are provided at positions in the Z2 direction when viewed from the diaphragm 24. Hereinafter, the piezoelectric element PZ1 and the piezoelectric element PZ2 may be collectively referred to as a piezoelectric element PZ. The piezoelectric element PZ is a passive element that is deformed according to the potential change of the drive signal Com. In other words, the piezoelectric element PZ is an example of an energy conversion element that converts the electric energy of the drive signal Com into kinetic energy. Specifically, the piezoelectric element PZ is driven and deformed according to the potential change of the drive signal Com. The diaphragm 24 vibrates in conjunction with the deformation of the piezoelectric element PZ. When the diaphragm 24 vibrates, the pressure in the pressure chamber CV fluctuates. As the pressure in the pressure chamber CV fluctuates, the ink filled in the pressure chamber CV is discharged from the nozzle N through the communication flow path BR.

As shown in FIGS. 2 and 3, the sealing substrate 25 for protecting the plurality of piezoelectric elements PZ1 and the plurality of piezoelectric elements PZ2 is provided at a position in the Z2 direction when viewed from the pressure chamber substrate 23. The sealing substrate 25 is a plate-like member elongated in the Y axis direction and extending substantially parallel to the XY plane. The sealing substrate 25 is manufactured, for example, by processing a silicon single crystal substrate using semiconductor manufacturing technology, but any known material and manufacturing method may be employed to manufacture the sealing substrate 25.

A surface in the Z1 direction, in the two surfaces of the sealing substrate 25 whose normal direction is the Z axis direction, is provided with a recess for covering the plurality of piezoelectric elements PZ1 and a recess for covering the plurality of piezoelectric elements PZ2. Hereinafter, a sealing space covering the plurality of piezoelectric elements PZ1 and formed between the diaphragm 24 and the sealing substrate 25 is referred to as a sealing space SP1, and a sealing space covering the plurality of piezoelectric elements PZ2 and formed between the diaphragm 24 and the sealing substrate 25 is referred to as a sealing space SP2. Hereinafter, the sealing space SP1 and the sealing space SP2 may be collectively referred to as a sealing space SP. The sealing space SP is a space for sealing the piezoelectric element PZ and preventing the piezoelectric element PZ from being degraded due to the influence of moisture or the like. In addition, hereinafter, when the sealing substrate 25 is viewed from above in the Z1 direction, a portion corresponding to the side wall of the sealing space SP1 is referred to as a side wall WL1, and a portion corresponding to the side wall of the sealing space SP2 is referred to as a side wall WL2. Hereinafter, the side wall WL1 and the side wall WL2 may be collectively referred to as a side wall WL.

A through hole 250 is provided in the sealing substrate 25. The through hole 250 is a hole that is positioned between the sealing space SP1 and the sealing space SP2 when the sealing substrate 25 is viewed in the Z1 direction, and penetrates from a surface of the sealing substrate 25 in the Z1 direction to a surface of the sealing substrate 25 in the Z2 direction. The wiring substrate 4 is inserted into the through hole 250.

As shown in FIGS. 2 and 3, the flow path forming substrate 26 is provided at a position in the Z2 direction when viewed from the communication plate 22. The flow path forming substrate 26 is a plate-like member elongated in the Y axis direction and extending substantially parallel to the XY plane. The flow path forming substrate 26 is formed by, for example, injection molding of a resin material, but any known material and manufacturing method may be employed to manufacture the flow path forming substrate 26.

Ink flow paths are formed in the flow path forming substrate 26. Specifically, one supply flow path BB1 and one supply flow path BB2 are formed in the flow path forming substrate 26. Of these, the supply flow path BB1 communicates with the supply flow path BA1 and is provided to extend in the Y axis direction at a position in the Z2 direction when viewed from the supply flow path BA1. The supply flow path BB2 communicates with the supply flow path BA2 and is provided to extend in the Y axis direction at a position in the Z2 direction when viewed from the supply flow path BA2 and in the X2 direction when viewed from the supply flow path BB1. Hereinafter, the supply flow path BB1 and the supply flow path BB2 may be collectively referred to as a supply flow path BB.

The flow path forming substrate 26 is provided with an inlet HL1 that communicates with the supply flow path BB1 and an inlet HL2 that communicates with the supply flow path BB2.

Ink is supplied from the liquid container 93 to the supply flow path BB1 through the inlet HL1. The ink supplied from the liquid container 93 to the supply flow path BB1 through the inlet HL1 flows into the supply flow path BA1. A part of the ink that has flowed into the supply flow path BA1 passes through the coupling flow path BK1 and fills the pressure chamber CV1. When the piezoelectric element PZ1 is driven by the drive signal Com, a part of the ink filled in the pressure chamber CV1 is discharged from the nozzle N1 through the communication flow path BR1. In addition, ink is supplied to the supply flow path BB2 from the liquid container 93 through the inlet HL2. The ink supplied from the liquid container 93 to the supply flow path BB2 through the inlet HL2 flows into the supply flow path BA2. A part of the ink that flows into the supply flow path BA2 passes through the coupling flow path BK2 and fills the pressure chamber CV2. When the piezoelectric element PZ2 is driven by the drive signal Com, a part of the ink filled in the pressure chamber CV2 is discharged from the nozzle N2 through the communication flow path BR2.

A through hole 260 is provided in the flow path forming substrate 26. The through hole 260 is a hole that is positioned between the supply flow path BB1 and the supply flow path BB2 when the flow path forming substrate 26 is viewed in the Z1 direction, and penetrates from a surface of the flow path forming substrate 26 in the Z1 direction to a surface of the flow path forming substrate 26 in the Z2 direction. The wiring substrate 4 is inserted into the through hole 260.

As shown in FIGS. 2 and 3, the wiring substrate 4 is mounted on the surface of the diaphragm 24 in the Z2 direction. The wiring substrate 4 is a component for electrically coupling the liquid discharge head 1 to the control section 7. As the wiring substrate 4, for example, a flexible wiring substrate, such as FPC or FFC, is preferably employed. Here, FPC is an abbreviation for Flexible Printed Circuit, and FFC is an abbreviation for Flexible Flat Cable. An integrated circuit 40 is mounted on the wiring substrate 4. The integrated circuit 40 is an electric circuit that switches whether or not to supply the drive signal Com to the piezoelectric element PZ under the control of the control signal SI.

As shown in FIGS. 2 and 3, the compliance sheet CS1 is provided at a position in the Z1 direction when viewed from the communication plate 22 so as to block the supply flow path BA1 and the coupling flow path BK1, and, in addition, the compliance sheet CS2 is provided to block the supply flow path BA2 and the coupling flow path BK2. Hereinafter, the compliance sheet CS1 and the compliance sheet CS2 may be collectively referred to as a compliance sheet CS. The compliance sheet CS is a plate-like member elongated in the Y axis direction and extending substantially parallel to the XY plane. The compliance sheet CS is formed of an elastic material and absorbs pressure fluctuations of the ink in the supply flow path BA and the coupling flow path BK.

1.3. Detection Resistor TK

The detection resistor TK can more accurately measure the temperature of the ink in the pressure chamber CV by arranging the detection resistor TK closer to the pressure chamber CV. In the first embodiment, the detection resistor TK is provided between the piezoelectric body Qm, which is a part of the piezoelectric element PZ, and the diaphragm 24, and is provided at a position overlapping the pressure chamber CV when the liquid discharge head 1 is viewed from above in the Z1 direction. Hereinafter, the structure of the detection resistor TK will be described with reference to FIGS. 4, 6, and 7.

1.3.1. Structure of Detection Resistor TK

Figure 4:
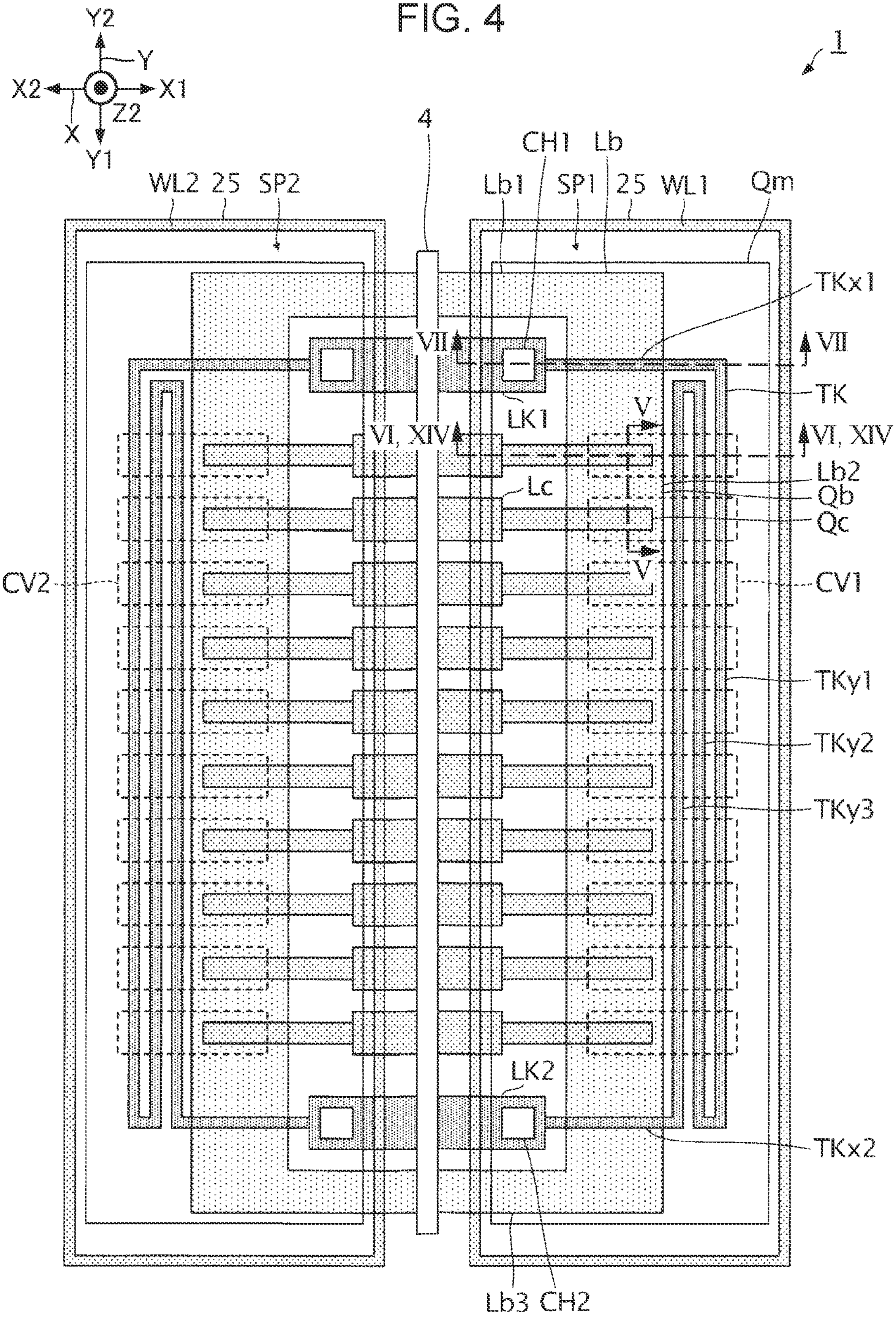
FIG. 4 is a plan view of the liquid discharge head when the liquid discharge head is viewed from above in the Z1 direction.
Figure 5:
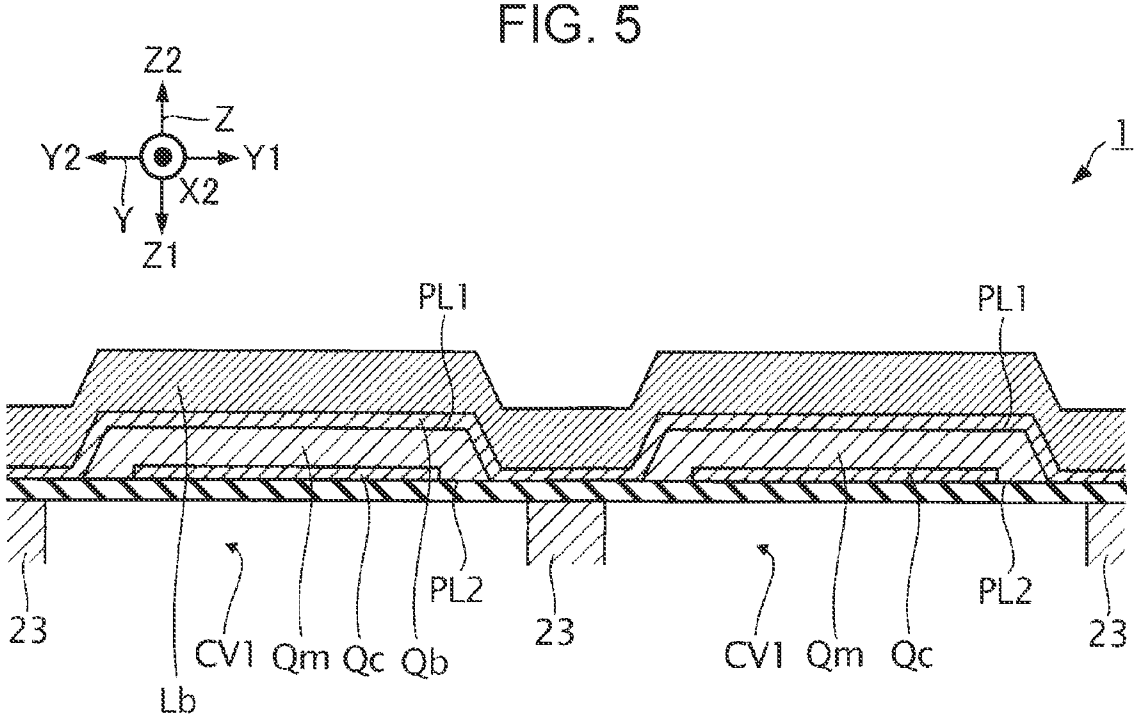
FIG. 5 is a cross-sectional view taken along line V-V in FIG. 4.

FIG. 4 is a plan view of the liquid discharge head 1 when the liquid discharge head 1 is viewed from above in the Z1 direction. FIG. 5 is a cross-sectional view taken along line V-V in FIG. 4. However, in FIG. 4, for easy description, the flow path forming substrate 26 and the integrated circuit 40 are not shown. Furthermore, in FIG. 4, the peripheral edge of an element positioned on the back side of any one element, that is, a portion that is originally hidden by the element on the front side is not shown for convenience.

As shown in FIG. 4, when the liquid discharge head 1 is viewed from above in the Z1 direction, at a position overlapping the sealing space SP1 that is a space positioned inside the side wall WL1 of the sealing substrate 25, the plurality of pressure chambers CV1 corresponding to the plurality of nozzles N1, a plurality of individual electrodes Qc corresponding to the plurality of nozzles N1, a plurality of individual wirings Lc corresponding to the plurality of nozzles N1, a plurality of piezoelectric bodies Qm, a common electrode Qb, and a common wiring Lb, the detection resistor TK, the detection wiring LK1, and the detection wiring LK2 are provided.

Here, the dimension of each portion in FIG. 4 is merely an example, and the actual dimension may be different. For example, a region where the three of the individual electrode Qc, the piezoelectric body Qm, and the common electrode Qb overlap when viewed from the Z axis direction corresponds to a region where the diaphragm 24 vibrates, so-called an active region. The width of the active region in the X axis direction may be longer than the width shown in FIG. 4. The longer the width of the region in the X axis direction, the wider the width in which the diaphragm 24 can vibrate, and the larger the amount of vibration, thereby being preferable in terms of discharge characteristics. The discharge characteristics are one or both of the discharge amount and the discharge speed.

In FIG. 4, the common electrode Qb is formed in a range that does not overlap extending parts TKy1, TKy2, and TKy3, which will be described later, when viewed from the Z axis direction, but may be formed in a range that overlaps the extending parts TKy1, TKy2, and TKy3. That is, the width of the part, which extends in the Y axis direction, of the common electrode Qb in the X axis direction is longer than that shown in FIG. 4, and, as a result, the common electrode Qb may overlap the extending parts TKy1, TKy2, and TKy3.

In FIG. 4, when viewed from the Z axis direction, the common electrode Qb and the common wiring Lb completely overlap, in other words, disposed in the same positional relationship on the XY plane, but the positional relationship may be different. For example, the common electrode Qb may be formed as shown in FIG. 4, and the common wiring Lb may be divided into two at a portion extending in the Y axis direction.

The detection resistor TK is a resistance wiring used to detect the temperature of the ink in the pressure chamber CV1, and the electric resistance of the detection resistor TK changes according to the temperature of the detection resistor TK. The temperature specifying section 71 uses a property that the electric resistance of the detection resistor TK changes according to the temperature of the detection resistor TK to specify the temperature of the ink in the pressure chamber CV1 based on the detection result signal DK having a value corresponding to the voltage VK detected from the detection resistor TK.

One end of the detection resistor TK is coupled to the contact hole CH1 of the detection wiring LK1 and electrically coupled to the wiring provided on the wiring substrate 4 via the detection wiring LK1. The other end of the detection resistor TK is coupled to the contact hole CH2 of the detection wiring LK2 and electrically coupled to the wiring provided on the wiring substrate 4 via the detection wiring LK2.

The detection resistor TK includes an extending part TKx1, the extending part TKy1, the extending part TKy2, the extending part TKy3, and an extending part TKx2.

The extending part TKx1 extends in the X axis direction and has one end that is coupled to the contact hole CH1 of the detection wiring LK1 and the other end that is coupled to the extending part TKy1. The extending part TKy1 extends in the Y axis direction and has one end that is coupled to the extending part TKx1 and the other end that is coupled to the extending part TKy2. The extending part TKy2 extends in the Y axis direction at a position closer to the wiring substrate 4 than the extending part TKy1, and has one end that is coupled to the extending part TKy1 and the other end that is coupled to the extending part TKy3. The extending part TKy3 extends in the Y axis direction at a position closer to the wiring substrate 4 than the extending part TKy2, and has one end that is coupled to the extending part TKy2 and the other end that is coupled to the extending part TKx2. The extending part TKx2 extends in the X axis direction at a position in the Y1 direction from the extending part TKx1, and has one end that is coupled to the contact hole CH2 of the detection wiring LK2 and the other end that is coupled to the extending part TKy3.

The current I0, which is a constant current of a predetermined magnitude, is supplied from the current supply circuit 81 to the detection wiring LK1 through the wiring on the wiring substrate 4. The wiring on the wiring substrate 4 set to the ground potential is electrically coupled to the detection wiring LK2. For this reason, the current I0 supplied to the detection wiring LK1 flows from the detection wiring LK1 to the wiring on the wiring substrate 4, to which the detection wiring LK2 is electrically coupled, through the extending part TKx1, the extending part TKy1, the extending part TKy2, the extending part TKy3, the extending part TKx2, and the detection wiring LK2.

The detection resistor TK is formed of a conductive material whose electric resistance value is dependent on the temperature. Specifically, as the material of the detection resistor TK, for example, gold, platinum, iridium, aluminum, copper, titanium, tungsten, nickel, chromium, or the like can be employed.

In addition, the detection wiring LK1 and the detection wiring LK2 are formed of a conductive material. As the materials of the detection wiring LK1 and the detection wiring LK2, for example, gold, copper, titanium, tungsten, nickel, chromium, platinum, aluminum, or the like can be employed. In the present embodiment, as the material of the detection wiring LK1 and the detection wiring LK2, a material having an electric resistance value smaller than the electric resistance value of the detection resistor TK is employed. For this reason, in the present embodiment, the voltage VK between both ends of the detection resistor TK can be accurately grasped, as compared to an aspect in which a material having a larger electric resistance value than the detection resistor TK is used as the materials of the detection wiring LK1 and the detection wiring LK2. However, the present disclosure is not limited to the aspect. For example, the detection wiring LK1 and the detection wiring LK2 may be formed of the same material as the detection resistor TK.

The common wiring Lb includes a partial wiring Lb1, a partial wiring Lb2, and a partial wiring Lb3.

The partial wiring Lb1 extends in the X axis direction, and has one end that is electrically coupled to the wiring provided on the wiring substrate 4 and the other end that is coupled to the partial wiring Lb2. The partial wiring Lb2 extends in the Y axis direction, and has one end that is coupled to the partial wiring Lb1 and the other end that is coupled to the partial wiring Lb3. The partial wiring Lb3 extends in the X axis direction, and has one end that is coupled to the partial wiring Lb2 and the other end that is electrically coupled to the wiring provided on the wiring substrate 4.

The wiring on the wiring substrate 4 to which the partial wiring Lb1 is electrically coupled and the wiring on the wiring substrate 4 to which the partial wiring Lb3 is electrically coupled are set to a predetermined reference potential VBS. Therefore, the potential of the common wiring Lb is also set to the reference potential VBS.

The common electrode Qb is provided in a region overlapping with the partial wiring Lb2 when the liquid discharge head 1 is viewed from above in the Z1 direction. In the present embodiment, the common electrode Qb is commonly provided for the plurality of pressure chambers CV1. More specifically, the common electrode Qb is provided to overlap the plurality of pressure chambers CV1 when the liquid discharge head 1 is viewed from above in the Z1 direction. However, the common electrode Qb may be provided so that, when the liquid discharge head 1 is viewed from above in the Z1 direction, some or all of the plurality of pressure chambers CV1 have portions that do not overlap the common electrode Qb.

As shown in FIG. 5, in the two surfaces of the piezoelectric body Qm having the Z axis direction as the normal direction, a surface in the Z2 direction is referred to as a surface PL1, and a surface in the Z1 direction is referred to as a surface PL2. As shown in FIG. 5, the common electrode Qb is provided on the surface PL1 of the piezoelectric body Qm. In the first embodiment, the common electrode Qb is a so-called upper electrode. The surface PL1 is an example of a “first surface”. The surface PL2 is an example of a “second surface”.

The common electrode Qb is coupled to the partial wiring Lb2. Therefore, the potential of the common electrode Qb is set to the reference potential VBS. Here, in the first embodiment, the common electrode Qb is an example of a “first electrode”.

The common electrode Qb is formed of a conductive material. Specifically, as the material of the common electrode Qb, for example, a metal such as platinum, iridium, gold, or titanium, or a conductive material such as a conductive metal oxide including indium tin oxide abbreviated as ITO can be employed.

In addition, the common wiring Lb is formed of a conductive material. Specifically, as the material of the common wiring Lb, for example, gold, copper, titanium, tungsten, nickel, chromium, platinum, aluminum, or the like can be employed.

The piezoelectric body Qm is provided in common for a plurality of pressure chambers CV1. More specifically, when the liquid discharge head 1 is viewed from above in the Z1 direction, the piezoelectric body Qm is provided to overlap the plurality of pressure chambers CV1. However, when the liquid discharge head 1 is viewed from above in the Z1 direction, some or all of the plurality of pressure chambers CV1 may be provided to have parts that do not overlap the piezoelectric body Qm.

The piezoelectric body Qm includes a crystal film having a perovskite structure formed of a ferroelectric ceramic material exhibiting an electromechanical conversion action, that is, a so-called perovskite type crystal. Specifically, as the material of the piezoelectric body Qm, for example, a ferroelectric piezoelectric material such as lead zirconated titanate, or a material obtained by adding niobium oxide, nickel oxide, or a metal oxide such as magnesium oxide to the ferroelectric piezoelectric material such as lead zirconate titanate can be employed. More specifically, as the material of the piezoelectric body Qm, for example, lead titanate, lead zirconate titanate, lead zirconate, lead lanthanum titanate, lead lanthanum zirconate titanate, or magnesium niobate-lead zirconate titanate, or the like can be employed.

As described above, the liquid discharge head 1 is provided with the plurality of individual electrodes Qc corresponding to the plurality of pressure chambers CV1. In addition, the liquid discharge head 1 is provided with the plurality of individual wirings Lc corresponding to the plurality of individual electrodes Qc. The drive signal Com is supplied from the control section 7 to each individual wiring Lc through the wiring provided on the wiring substrate 4. As illustrated in FIG. 5, the individual electrode Qc is provided on the surface PL2 of the piezoelectric body Qm. In the first embodiment, the individual electrode Qc is a so-called lower electrode.

Any one pressure chamber CV1 of the plurality of pressure chambers CV1 is an example of a “first pressure chamber”, a piezoelectric body Qm provided to correspond to the pressure chamber CV1 is an example of a “first piezoelectric body”, and an individual electrode Qc provided on the piezoelectric body Qm is an example of a “second electrode”. A pressure chamber CV1 different from the any one pressure chamber CV1 is an example of a “second pressure chamber”, a piezoelectric body Qm provided to correspond to the pressure chamber CV1 is an example of a “second piezoelectric body”, and an individual electrode Qc provided on the piezoelectric body Qm is an example of a “third electrode”. The piezoelectric body Qm provided to correspond to the pressure chamber CV1 is a piezoelectric body Qm that overlaps the pressure chamber CV1 when the liquid discharge head 1 is viewed from above in the Z1 direction.

The individual wiring Lc is formed of a conductive material. Specifically, as the material of the individual wiring Lc, for example, gold, copper, titanium, tungsten, nickel, chromium, platinum, aluminum, or the like can be employed.

In addition, the individual electrode Qc is formed of a conductive material. Specifically, as the material of the individual electrode Qc, for example, a metal such as platinum, iridium, gold, or titanium, or a conductive material such as a conductive metal oxide including indium tin oxide abbreviated as ITO can be employed. In the present embodiment, as an example, a case is assumed in which the detection resistor TK is formed of the same material as the individual electrode Qc. Specifically, in the present embodiment, as an example, a case is assumed in which the detection resistor TK and the individual electrode Qc are formed of platinum.

The piezoelectric element PZ is a laminated body in which a piezoelectric body Qm is interposed between the common electrode Qb which is set at a reference potential VBS and the individual electrode Qc to which the drive signal Com is supplied. When the liquid discharge head 1 is viewed from above in the Z1 direction, a portion where the piezoelectric body Qm, the common electrode Qb, and the individual electrode Qc corresponding to one pressure chamber CV1 overlap corresponds to the piezoelectric element PZ corresponding to one pressure chamber CV1. The pressure chamber CV1 corresponding to the piezoelectric element PZ is provided at a position of the piezoelectric element PZ in the Z1 direction.

As described above, the piezoelectric element PZ is driven and deformed according to the potential change of the drive signal Com. The diaphragm 24 vibrates in conjunction with the deformation of the piezoelectric element PZ. When the diaphragm 24 vibrates, the pressure in the pressure chamber CV1 fluctuates. When the pressure in the pressure chamber CV1 fluctuates, the ink filled in the pressure chamber CV1 is discharged from the nozzle N1 through the communication flow path BR1.

Figure 6:
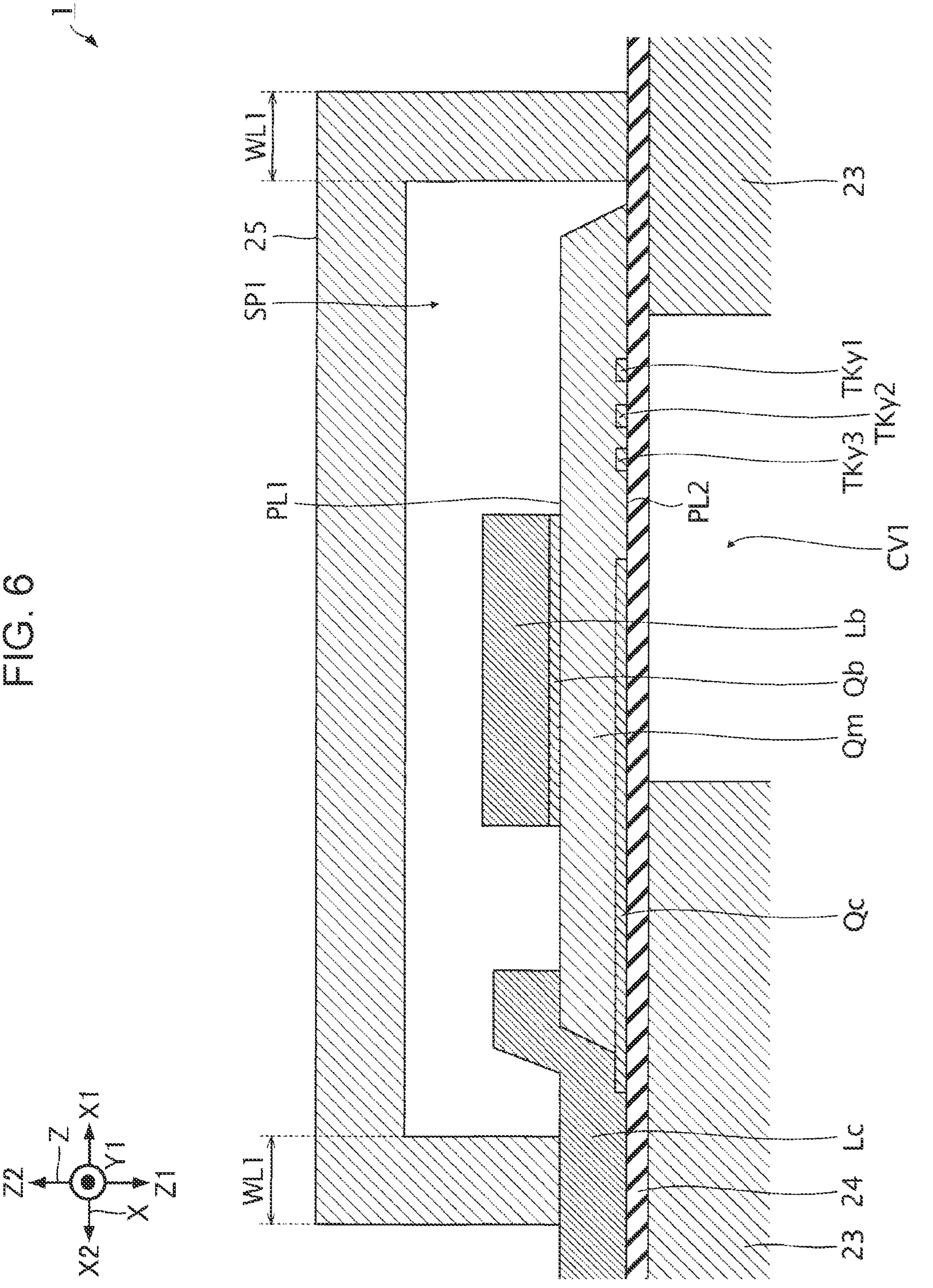
FIG. 6 is a cross-sectional view taken along line VI-VI in FIG. 4.
Figure 7:
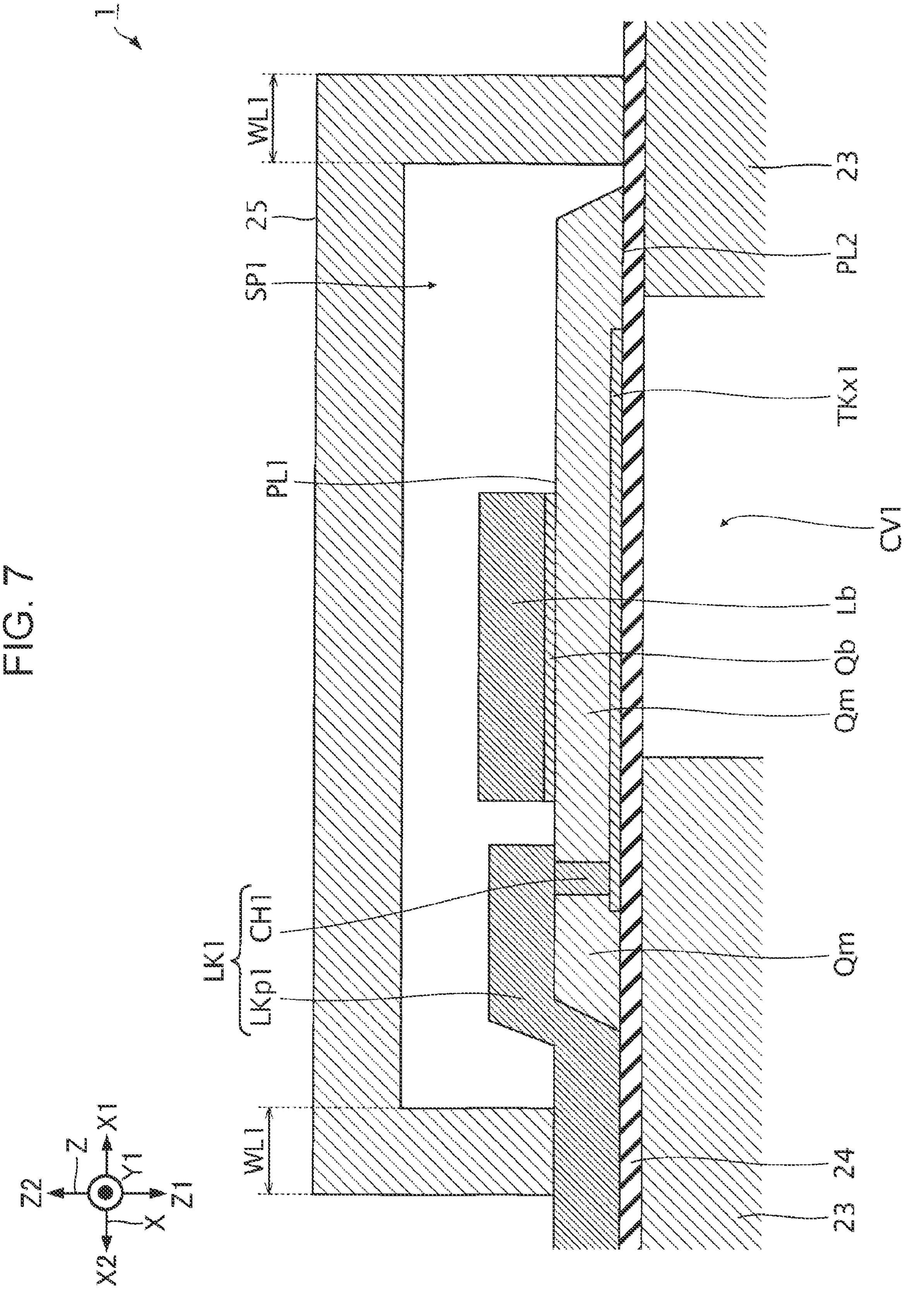
FIG. 7 is a cross-sectional view taken along line VII-VII in FIG. 4.

In FIG. 4 and FIGS. 6 and 7, which will be described later, the configuration of the portion, which corresponds to the sealing space SP1 positioned in the X1 direction from the wiring substrate 4, of the liquid discharge head 1 is illustrated and described. However, the same description as in FIGS. 4, 6, and 7 also corresponds to the configuration of the portion corresponding to the sealing space SP2 positioned in the X2 direction from the wiring substrate 4.

FIG. 6 is a cross-sectional view taken along line VI-VI in FIG. 4.

As shown in FIG. 6, in the two surfaces of the diaphragm 24 whose normal direction is the Z axis direction, the surface in the Z2 direction is formed with the individual wiring Lc, the individual electrode Qc, the detection resistor TK, the piezoelectric body Qm, and the sealing substrate 25.

Hereinafter, in the two surfaces of the piezoelectric body Qm having the Z axis direction as the normal direction, the surface in the Z2 direction is referred to as a surface PL1, and the surface in the Z1 direction is referred to as a surface PL2.

The common electrode Qb and the individual wiring Lc are formed on the surface PL1 of the piezoelectric body Qm. In the two surfaces of the common electrode Qb having the Z axis direction as a normal direction, a surface in the Z2 direction is formed with a partial wiring Lb2 which is a part of the common wiring Lb.

An individual electrode Qc and the detection resistor TK are formed on the surface PL2 of the piezoelectric body Qm. In the present embodiment, the detection resistor TK is provided at a position that overlaps the sealing space SP when the liquid discharge head 1 is viewed in the Z1 direction. That is, in the present embodiment, the detection resistor TK is provided at a position that does not overlap the side wall WL1 of the sealing substrate 25 when the liquid discharge head 1 is viewed in the Z1 direction.

FIG. 7 is a cross-sectional view taken along line VII-VII in FIG. 4.

As shown in FIG. 7, the detection wiring LK1 has a wiring portion LKp1 and a contact hole CH1. In the two surfaces of the diaphragm 24 having the Z axis direction as a normal direction, a surface in the Z2 direction is formed with the wiring portion LKp1, the detection resistor TK, the piezoelectric body Qm, and the sealing substrate 25.

The wiring portion LKp1 and the common electrode Qb are formed on the surface PL1 of the piezoelectric body Qm. In the two surfaces of the common electrode Qb having the Z axis direction as a normal direction, a surface in the Z2 direction is formed with a partial wiring Lb2 which is a part of the common wiring Lb.

The detection resistor TK is formed on the surface PL2 of the piezoelectric body Qm. The detection resistor TK and the wiring portion LKp1 are electrically coupled by the contact hole CH1 penetrating the piezoelectric body Qm.

In the present embodiment, a case is assumed in which the detection wiring LK2 has the same configuration as the detection wiring LK1, the extending part TKx2 has the same configuration as the extending part TKx1, and the partial wiring Lb3 has the same configuration as the partial wiring Lb1.

1.3.2. Role of Detection Resistor TK

The current I0 supplied from the current supply circuit 81 to the detection wiring LK1 flows to the detection wiring LK2 set to the ground potential through the detection resistor TK. Therefore, the voltage VK applied between one end of the detection resistor TK coupled to the detection wiring LK1 and the other end of the detection resistor TK coupled to the detection wiring LK2 is represented as "VK=I0*RK" using the resistance value RK between the one end and the other end of the detection resistor TK. That is, when the current I0 is supplied from the current supply circuit 81 to the detection resistor TK through the detection wiring LK1, the voltage detection circuit 82 detects the voltage VK indicating a value "I0*RK" from the detection resistor TK.

Since the resistance value RK changes according to the temperature of the detection resistor TK, the temperature specifying section 71 can specify the temperature of the pressure chamber CV1 based on the detection result signal DK indicating the voltage VK detected by the voltage detection circuit 82. The characteristic of the resistance value RK corresponding to the temperature of the detection resistor TK can be specified by determining the constituent material of the detection resistor TK and the shape of the detection resistor TK. The constituent material of the detection resistor TK and the shape of the detection resistor TK are items determined by the developer of the liquid discharge head 1. As described above, the storage section 6 has the temperature characteristic table 61. The temperature characteristic table 61 shows a relationship between the resistance value RK that can be taken by the detection resistor TK and the temperature corresponding to each of the resistance values RK of the plurality of resistance values RK that can be taken by the detection resistor TK. Since the current I0 has a predetermined magnitude, the resistance value RK and the voltage VK are in a proportional relationship. Therefore, the storage section 6 may store a table showing a relationship between a plurality of voltages VK that can be taken by the detection resistor TK and the temperature of each of the plurality of voltages VK that can be taken by the detection resistor TK, instead of the temperature characteristic table 61.

The temperature specifying section 71 refers to the temperature characteristic table 61, and specifies the temperature in the vicinity of the pressure chamber CV1 based on the detection result signal DK. More specifically, the temperature specifying section 71 calculates the resistance value RK by dividing the voltage VK indicated by the detection result signal DK by the current I0. Next, when the calculated resistance value RK is registered in the temperature characteristic table 61, the temperature specifying section 71 specifies the temperature corresponding to the registered resistance value RK as the temperature in the vicinity of the pressure chamber CV1. On the other hand, when the calculated resistance value RK is not registered in the temperature characteristic table 61, the temperature specifying section 71 specifies the temperature in the vicinity of the pressure chamber CV1 by executing an interpolation process based on the temperature corresponding to the calculated resistance value RK in the plurality of resistance values RK registered in the temperature characteristic table 61. The interpolation process includes, for example, linear interpolation, cubic spline interpolation, and the like.

1.4. Deterioration Characteristics of Piezoelectric Body Qm

The drive of the piezoelectric element PZ affects the temperature measured by the detection resistor TK. When the piezoelectric element PZ is driven, the piezoelectric body Qm is charged and discharged, and, when the charge is discharged, the piezoelectric body Qm generates heat. Here, when the piezoelectric body Qm deteriorates, a difference in displacement of the piezoelectric body Qm is reduced, and the charge discharge amount, which is released from the piezoelectric body Qm, is reduced as the difference is reduced, so that a fact that the heat generation amount of the piezoelectric body Qm is decreased is obtained by the experiments of the inventors. Therefore, the degree of deterioration of the piezoelectric body Qm can be specified by measuring the heat generation amount of the detection resistor TK. The process of specifying the degree of deterioration of the piezoelectric body Qm is described as a "deterioration specifying process" hereinafter. Further, the difference in the displacement of the piezoelectric body Qm is described as a "displacement change amount".

It is preferable that conditions are the same when the deterioration specifying process is executed, in order to accurately specify the displacement characteristics of the piezoelectric body Qm before and after the deterioration. Hereinafter, the conditions will be referred to as a "deterioration specifying condition". The deterioration specifying condition is at least one of a condition that the drive signal Com to be applied to the piezoelectric body Qm is the same, a condition that a period during which the drive signal Com is applied is the same, and a condition that the number of times of discharge is the same. It is preferable that all the three conditions are satisfied. In the present embodiment, it is assumed that the deterioration specifying condition satisfies all the three conditions. More specifically, in the deterioration specifying condition in the present embodiment, an inspection drive signal Com-H to be applied to the piezoelectric body Qm in the deterioration specifying process is applied for a predetermined period. The predetermined period is determined by the developer and the like of the liquid discharge head 1. For example, the developer determines a period, during which the piezoelectric body Qm generates heat to the extent that the detection resistor TK can be sufficiently measured, as the predetermined period. By applying the inspection drive signal Com-H for the predetermined period, the condition that the number of times of discharge is the same is inevitably satisfied. The deterioration specifying condition is an example of a "predetermined condition". Furthermore, in the present embodiment, for simplification of the description, it is assumed that the inspection drive signal Com-H is applied to all of the plurality of piezoelectric bodies Qm located in the X1 direction from the wiring substrate 4. However, the drive signal Com may be applied to some piezoelectric bodies Qm of the plurality of piezoelectric bodies Qm located in the X1 direction from the wiring substrate 4. The deterioration characteristics of the piezoelectric body Qm will be described with reference to FIGS. 8 and 9.

Figure 8:
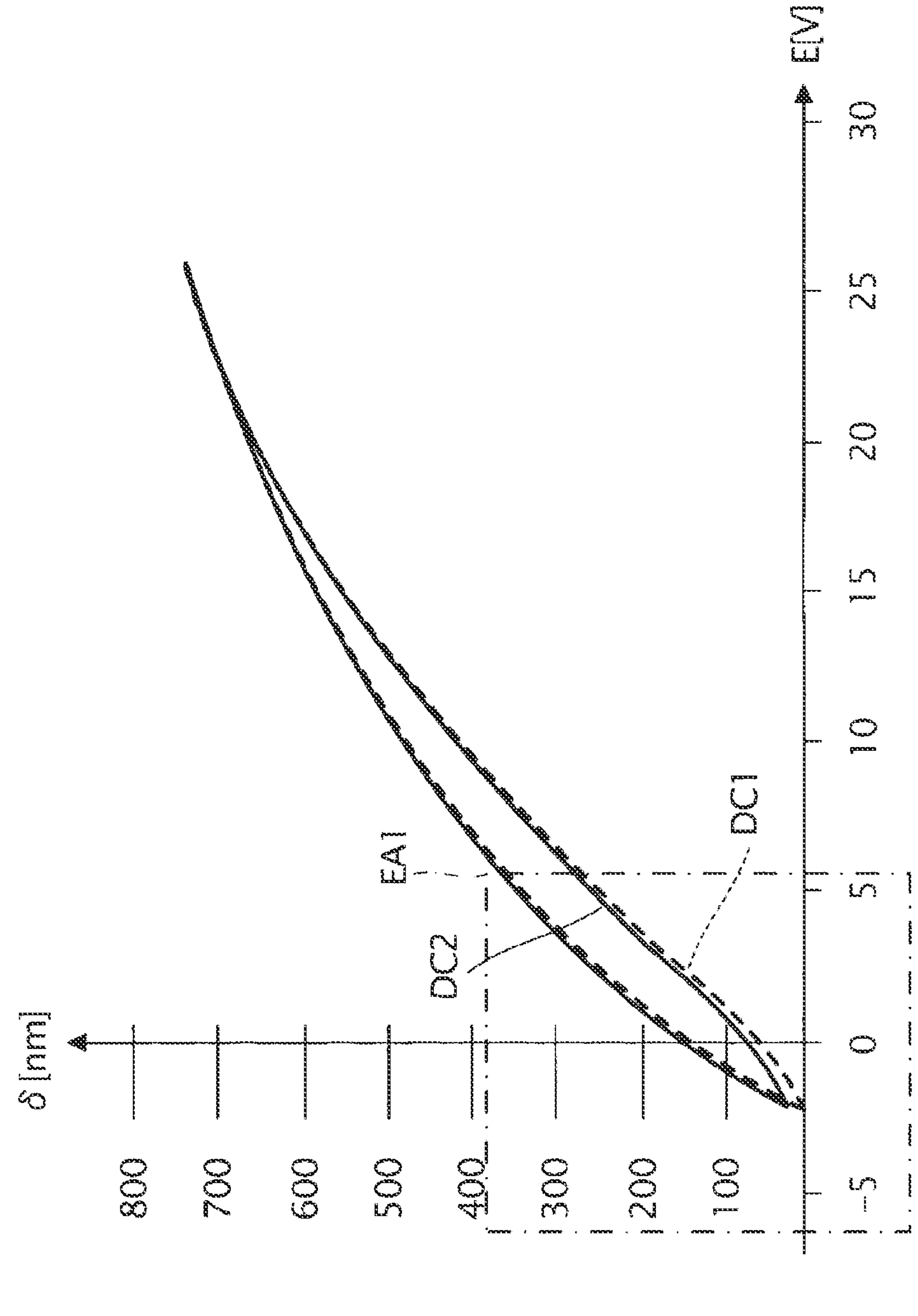
FIG. 8 is an explanatory diagram for explaining a relationship between a potential and a displacement of a piezoelectric body before and after deterioration.

FIG. 8 is an explanatory diagram for explaining a relationship between a potential and a displacement of the piezoelectric body Qm before and after deterioration. The horizontal axis of a graph shown in FIG. 8 indicates a potential E, and the vertical axis of the graph shown in FIG. 8 indicates a displacement δ of the piezoelectric body Qm. A displacement characteristic DC1 shown in FIG. 8 indicates the displacement characteristic of the piezoelectric body Qm before the piezoelectric body Qm deteriorates. A displacement characteristic DC2 shown in FIG. 8 indicates the displacement characteristic of the piezoelectric body Qm after the piezoelectric body Qm deteriorates to some extent. As the deterioration of the piezoelectric body Qm progresses, the inclination of the displacement of the piezoelectric body Qm is reduced, so that the displacement change amount decreases. The reduction in the displacement change amount will be described with reference to FIG. 9.

Figure 9:
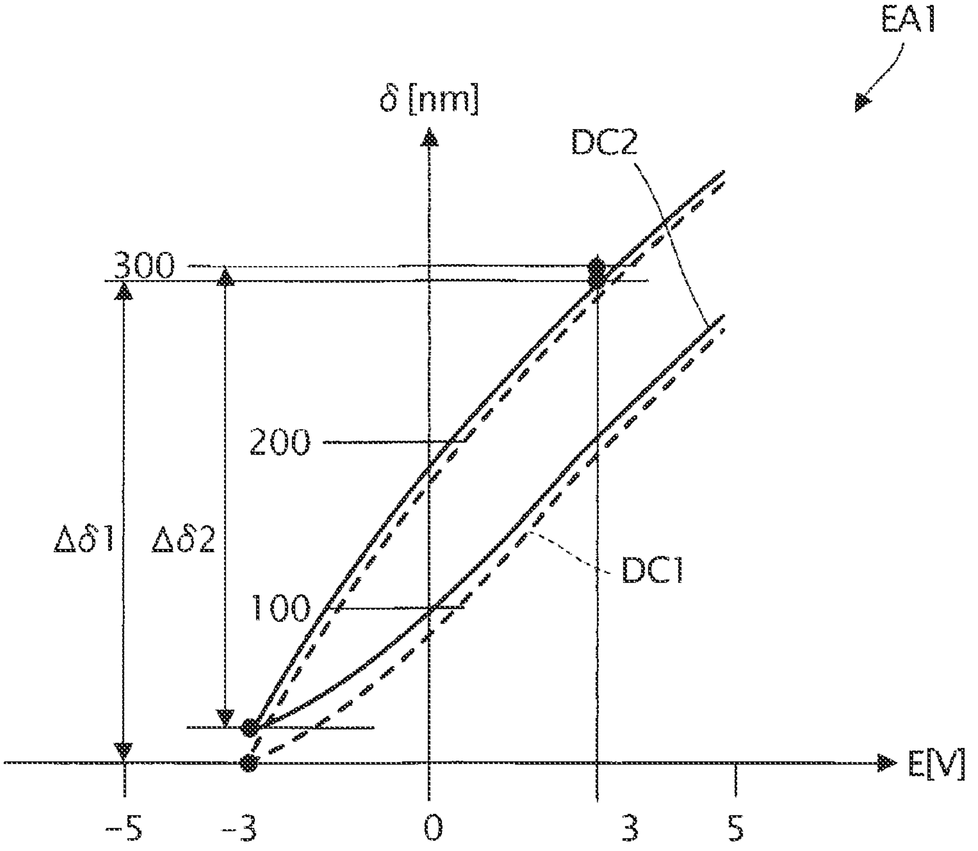
FIG. 9 is an enlarged view of a region in FIG. 8.

FIG. 9 is an enlarged view of a region EA1 in FIG. 8. The region EA1 indicates the displacement δ of the piezoelectric body Qm when the potential E of the piezoelectric body Qm is −5 [V] to 5 [V]. [V] means a potential and a volt that is a unit of a voltage which is a voltage difference. Before the piezoelectric body Qm deteriorates, a displacement change amount Δδ1 in which the piezoelectric body Qm is from 3 [V] to −3 [V] is approximately 290 [nm] from about 290 [nm] to about 0 [nm] as indicated by the displacement characteristic DC1. In addition, [nm] means nanometer. After the piezoelectric body Qm deteriorates to some extent, a displacement change amount Δδ2 in which the piezoelectric body Qm is from 3 [V] to −3 [V] is approximately 270 [nm] from about 300 [nm] to about 30 [nm] as indicated by the displacement characteristic DC2. Therefore, the displacement change amount Δδ2 is smaller than the displacement change amount Δδ1 by about 20 [nm]. When the drive signal Com is corrected so that the displacement change amount reduced by 20 [nm] returns to an original displacement change amount, it is necessary to increase the drive voltage Vh, which is the difference between the minimum voltage and the maximum voltage of the drive signal Com, by about 1 [V] to 2 [V].

Figure 10:
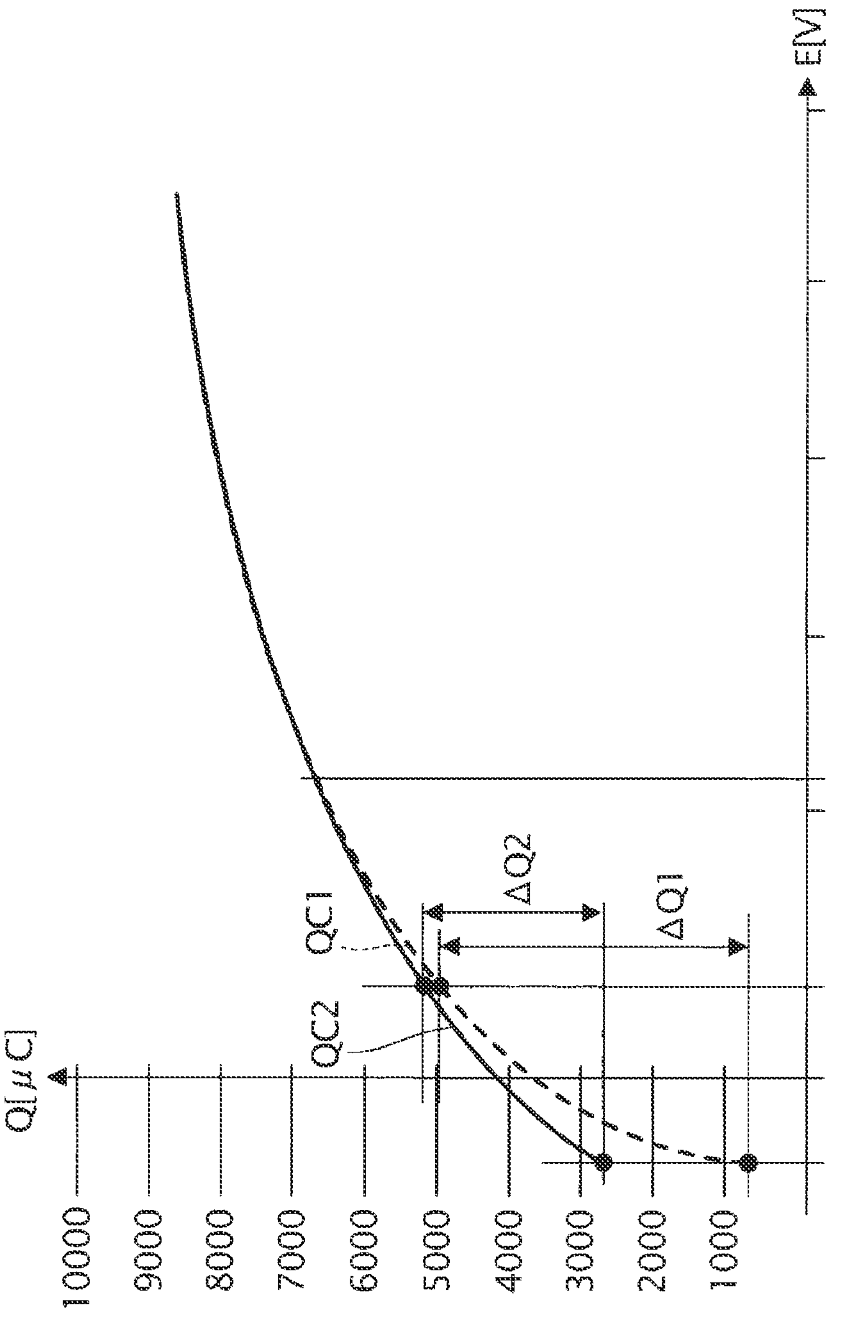
FIG. 10 is an explanatory diagram for explaining a relationship between a potential and a charge of the piezoelectric body before and after deterioration.

FIG. 10 is an explanatory diagram for explaining a relationship between the potential and the charge of the piezoelectric body Qm before and after the deterioration. The horizontal axis of a graph shown in FIG. 10 indicates the potential E, and the vertical axis of the graph illustrated in FIG. 10 indicates a charge Q of the piezoelectric body Qm. The charge characteristic QC1 shown in FIG. 10 indicates the charge characteristic of the piezoelectric body Qm before the piezoelectric body Qm deteriorates. The charge characteristic QC2 shown in FIG. 10 indicates the charge characteristic of the piezoelectric body Qm after the piezoelectric body Qm deteriorates to some extent. Before the piezoelectric body Qm deteriorates, the charge discharge amount ΔQ1 released from the piezoelectric body Qm from 3 [V] to −3 [V] is about 4300 [μC] from about 5000 [μC] to about 700 [μC], as indicated by the charge characteristic QC1. [μC] means microcoulomb. After the piezoelectric body Qm deteriorates to some extent, the charge discharge amount ΔQ2 released from the piezoelectric body Qm from 3 [V] to −3 [V] is about 2400 [μC] from about 5100 [μC] to about 2700 [μC], as indicated by the charge characteristic QC2. Therefore, the charge discharge amount ΔQ2 is 1900 [μC] less than the charge discharge amount ΔQ1.

As can be understood from FIGS. 8 and 10, it can be said that the charge discharge amount before and after the deterioration can be measured more accurately than the displacement change amount before and after the deterioration. More specifically, as compared with the number of digits of the displacement change amount Δδ1 and the displacement change amount Δδ2, the number of digits of the difference between the displacement change amount Δδ1 and the displacement change amount Δδ2 is one tenth. On the other hand, it can be said that the number of digits of the charge discharge amount ΔQ1 and the charge discharge amount ΔQ2 is the same as the number of digits of the difference between the charge discharge amount ΔQ1 and the charge discharge amount ΔQ2. That is, the charge discharge amount with respect to the difference in the charge discharge amount before and after the deterioration is larger than the displacement change amount with respect to the difference in the displacement change amount before and after the deterioration. Therefore, by measuring the charge discharge amount of the piezoelectric body Qm, the influence of noise at the time of measurement can be reduced as compared with the aspect in which the displacement of the piezoelectric body Qm is measured, so that the degree of deterioration of the piezoelectric body Qm can be accurately measured.

Further, as can be understood from FIG. 10, the charge discharge amount, in which the piezoelectric body Qm is from 3 [V] to −3 [V], is larger than the charge discharge amount, for example, from 9 [V] to 3 [V] either before or after the deterioration. Therefore, it is preferable that 3 [V] to −3 [V] is included between the minimum potential and the maximum potential of the inspection drive signal Com-H.

A fact is obtained by the experiments of the inventors that the heat generation amount of the piezoelectric body Qm and the degree of deterioration of the piezoelectric body Qm have a characteristic that the degree of decrease in the heat generation amount of the piezoelectric body Qm becomes gradual as the deterioration of the piezoelectric body Qm progresses. The relationship between the heat generation amount of the piezoelectric body Qm and the degree of deterioration of the piezoelectric body Qm will be described with reference to FIG. 11.

Figure 11:
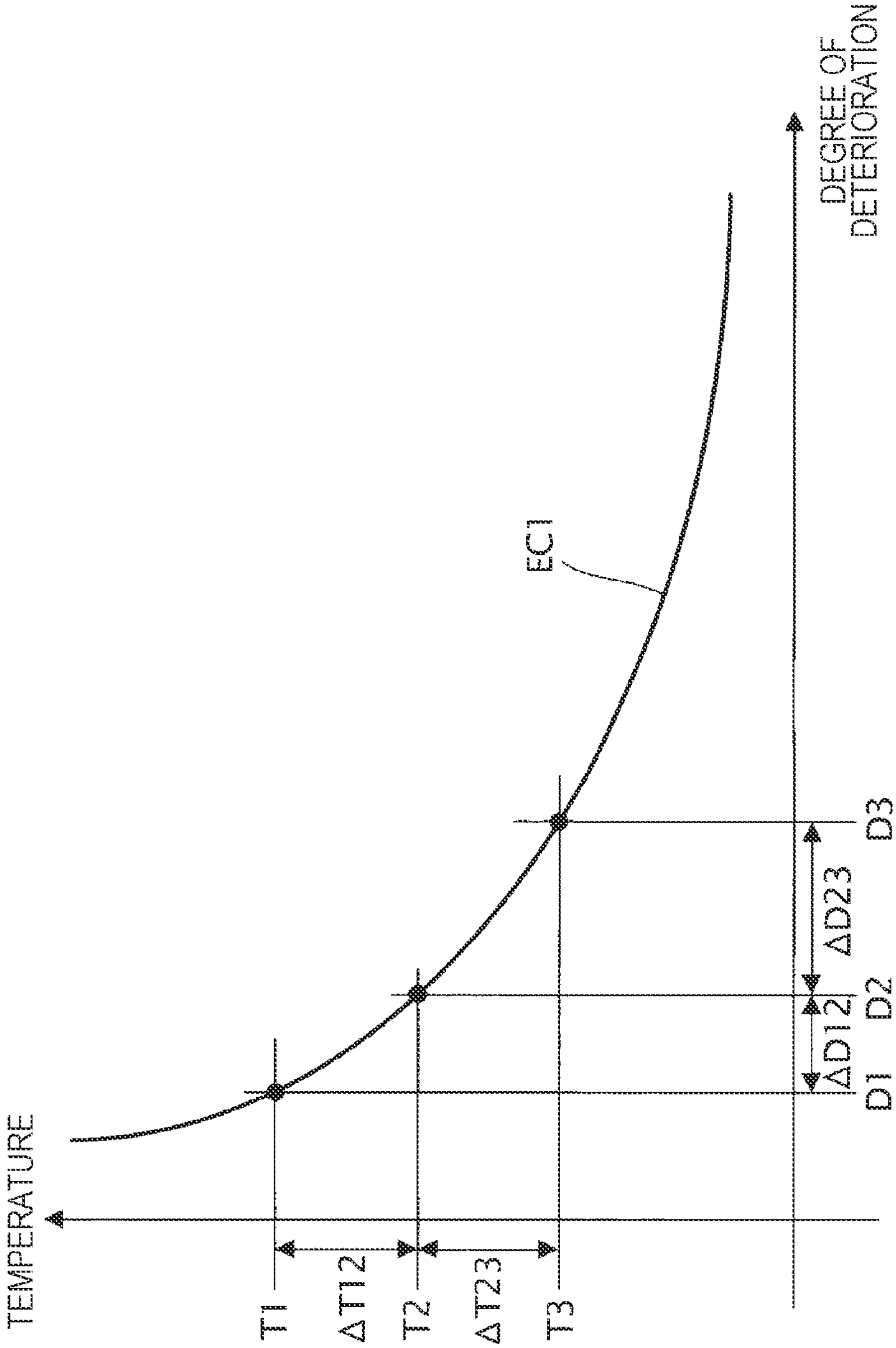
FIG. 11 is an explanatory diagram for explaining a relationship between the heat generation amount of the piezoelectric body and the degree of deterioration of the piezoelectric body.

FIG. 11 is an explanatory diagram for explaining the relationship between the heat generation amount of the piezoelectric body Qm and the degree of deterioration of the piezoelectric body Qm. The horizontal axis of a graph shown in FIG. 11 indicates the degree of deterioration of the piezoelectric body Qm, and a vertical axis of the graph shown in FIG. 11 indicates the temperature of the piezoelectric body Qm due to the heat generation amount. In the deterioration specifying process, the decision section 75 decides the degree of deterioration of the piezoelectric body Qm based on the temperature specified by the temperature specifying section 71. Hereinafter, the temperature specified by the temperature specifying section 71 may be described as “heat generation temperature”. Further, for simplification of the description, it is assumed that the temperature in the vicinity of the pressure chamber CV1 before the deterioration specifying process is executed is constant.

The deterioration characteristic EC1 shown in FIG. 11 indicates the deterioration characteristic of the piezoelectric body Qm corresponding to the heat generation temperature. The decision section 75 refers to the deterioration characteristic table 65 showing the deterioration characteristic EC1, and decides the degree of deterioration of the piezoelectric body Qm by specifying the degree of deterioration corresponding to the heat generation temperature. The deterioration characteristic table 65 shows the relationship between a plurality of heat generation temperatures and information indicating the degree of deterioration of the piezoelectric body Qm corresponding to each of the plurality of heat generation temperatures. The deterioration characteristic table 65 is generated based on the values obtained from the experience or experiments of the developer of the liquid discharge head 1. The information indicating the degree of deterioration may be any information as long as the degree of deterioration can be compared. For example, the information indicating the degree of deterioration may be a numerical value in which the degree of deterioration of the piezoelectric body Qm is 0 immediately after the liquid discharge head 1 is manufactured and the degree of deterioration of the piezoelectric body Qm is 100 when the piezoelectric body Qm deteriorates to the extent that ink cannot be discharged even though the drive signal Com is corrected.

For example, when the heat generation temperature specified by the temperature specifying section 71 is registered in the deterioration characteristic table 65, the decision section 75 decides the degree of deterioration corresponding to the registered heat generation temperature as the degree of deterioration of the piezoelectric body Qm. On the other hand, when the heat generation temperature specified by the temperature specifying section 71 is not registered in the deterioration characteristic table 65, the decision section 75 executes the interpolation process based on the degree of deterioration corresponding to the heat generation temperature specified by the temperature specifying section 71 in a plurality of degrees of deterioration registered in the deterioration characteristic table 65, thereby deciding the degree of deterioration of the piezoelectric body Qm.

As shown by the deterioration characteristic EC1, it is shown that the piezoelectric body Qm deteriorates as the heat generation temperature decreases. For example, as shown in FIG. 11, a first temperature T1 is higher than a second temperature T2. For example, when the heat generation temperature specified by the temperature specifying section 71 is the first temperature T1, the decision section 75 refers to the deterioration characteristic table 65 and decides that the degree of deterioration of the piezoelectric body Qm is the first degree D1. Further, when the temperature specified by the temperature specifying section 71 is the second temperature T2, the decision section 75 refers to the deterioration characteristic table 65 and decides that the degree of deterioration of the piezoelectric body Qm is the second degree D2. As can be understood from FIG. 11, the second degree D2 indicates as deteriorated more than the first degree D1.

Furthermore, as shown by the deterioration characteristic EC1 indicates, the degree in which the heat generation amount of the piezoelectric body Qm decreases becomes gradual as the deterioration of the piezoelectric body Qm progresses. For example, as shown in FIG. 11, the first temperature T1, the second temperature T2, and a third temperature T3 are higher in this order. The decision section 75 refers to the deterioration characteristic table 65, and decides that the degree of deterioration of the piezoelectric body Qm is the third degree D3. A difference ΔT12 between the first temperature T1 and the second temperature T2 is substantially the same as a difference ΔT23 obtained by subtracting the third temperature T3 from the second temperature T2. The "substantially the same" includes not only a case of being completely the same but also a case of being considered to be the same when manufacturing errors are taken into consideration. As can be understood from FIG. 11, a difference ΔD23 between the second degree D2 and the third degree D3 is larger than a difference ΔD12 between the first degree D1 and the second degree D2.

1.5. Specific Content of Deterioration Specifying Process

The specific content of the deterioration specifying process, an operation of the temperature specifying section 71, an operation of the decision section 75, an operation of the determination section 77, and an operation of the notification section 9 will be described with reference to FIG. 12.

Figure 12:
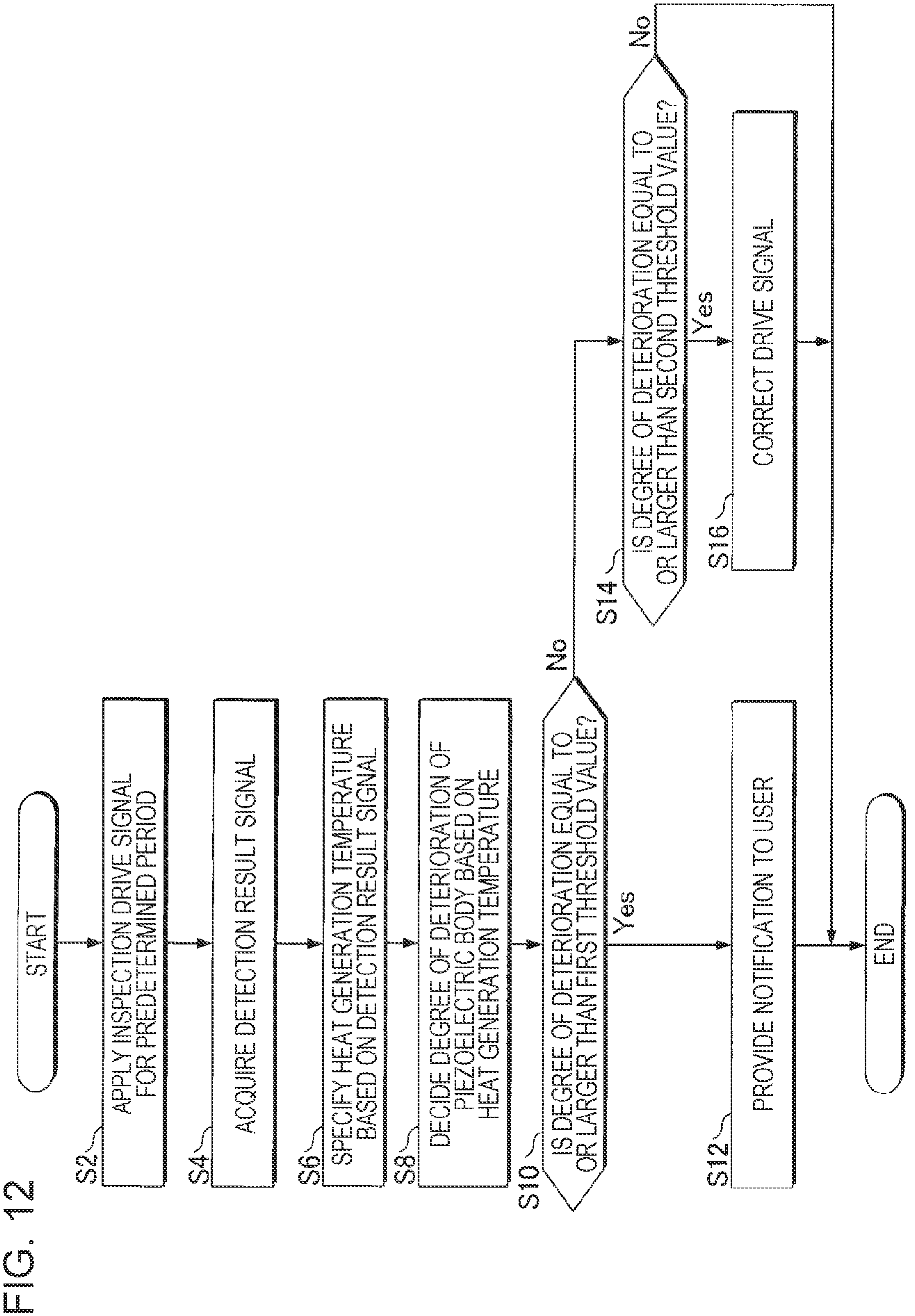
FIG. 12 is a diagram showing a flowchart showing a processing content of a deterioration specifying process.

FIG. 12 is a diagram showing a flowchart showing a processing content of the deterioration specifying process. The deterioration specifying process is executed, for example, before starting the printing process. In step S2, the control section 7 applies the inspection drive signal Com-H to the piezoelectric body Qm for a predetermined period. After the predetermined period elapses, in step S4, the control section 7 acquires the detection result signal DK from the voltage detection circuit 82. Next, in step S6, the temperature specifying section 71 specifies the heat generation temperature in the vicinity of the pressure chamber CV1. After the processing in step S6 ends, in step S8, the decision section 75 decides the degree of deterioration of the piezoelectric body Qm based on the heat generation temperature specified by the temperature specifying section 71.

After the processing in step S8 ends, in step S10, the notification section 9 notifies the user that the piezoelectric body Qm deteriorates, based on the decision result by the decision section 75. Specifically, the control section 7 determines whether or not the degree of deterioration decided by the decision section 75 is equal to or larger than a first threshold value. The first threshold value is, for example, the degree of deterioration when the piezoelectric body Qm deteriorates to the extent that the ink cannot be normally discharged even when the drive signal Com is corrected. The first threshold value is determined by the developer and the like of the liquid discharge head 1. When the determination result in step S10 is affirmative, in step S12, the notification section 9 notifies the user of information indicating that the piezoelectric body Qm deteriorates under the control of the control section 7. For example, the notification section 9 notifies the user of information indicating that "There is a possibility that the piezoelectric element of the liquid discharge head deteriorates and printing is not performed correctly. Please replace the liquid discharge head." After the process in step S12 ends, the liquid discharge device 100 ends a series of processes shown in FIG. 12. When receiving the above-described notification, the user may stop the liquid discharge device 100 from executing the printing process. The information indicating that the piezoelectric body Qm deteriorates is an example of "information related to the degree of deterioration of the first piezoelectric body".

However, the first threshold value is not limited to the above-described example. The first threshold value may be, for example, a degree of deterioration in a case where the piezoelectric body Qm deteriorates to the extent that the ink cannot be normally discharged even when the drive signal Com is corrected by driving the piezoelectric body Qm a predetermined number of times. The predetermined number of times is determined by the developer and the like of the liquid discharge head 1. For example, the notification section 9 may notify the user of the information that "the piezoelectric element of the liquid discharge head deteriorates and the replacement time of the liquid discharge head is approaching."

When the determination result in step S10 is negative, the determination section 77 determines the drive signal Com based on the decision result by the decision section 75. Specifically, in step S14, the determination section 77 determines whether or not the degree of deterioration decided by the decision section 75 is equal to or larger than the second threshold value. The second threshold value is, for example, the degree of deterioration when the piezoelectric body Qm deteriorates to the extent that the ink cannot be normally discharged without correcting the drive signal Com but the ink can be normally discharged by correcting the drive signal Com. The second threshold value indicates the degree of deterioration lower than the first threshold value. The second threshold value is determined by the developer and the like of the liquid discharge head 1. When the determination result in step S14 is affirmative, in other words, when the degree of deterioration decided by the decision section 75 is equal to or larger than the second threshold value and less than the first threshold value, the determination section 77 corrects the drive signal Com to the extent that the ink can be normally discharged in step S16. After the process in step S16 ends, the liquid discharge device 100 ends a series of processes shown in FIG. 12.

When the determination result in step S14 is negative, the liquid discharge device 100 ends the series of processes shown in FIG. 12. Even when the determination result in step S14 is negative, the notification section 9 may notify the user of information related to the degree of deterioration of the piezoelectric body Qm. For example, the notification section 9 may notify the user of information that "the piezoelectric element of the liquid discharge head is normal".

1.6. Summary of First Embodiment

As described above, the liquid discharge device 100 according to the first embodiment has the liquid discharge head 1 that includes the pressure chamber substrate 23 provided with the pressure chamber CV1 in which the ink is accommodated, the piezoelectric body Qm provided to correspond to the pressure chamber CV1, and the detection resistor TK for detecting the heat generation temperature in the vicinity of the pressure chamber CV1, and the control section 7 that functions as the decision section 75 which decides the degree of deterioration of the piezoelectric body Qm based on the detection result of the detection resistor TK.

Since the phenomenon is used that the heat generation amount of the piezoelectric body Qm decreases when the piezoelectric body Qm deteriorates, the degree of deterioration of the piezoelectric body Qm is reflected in the detection result of the detection resistor TK. Therefore, the liquid discharge device 100 according to the first embodiment can accurately decide the degree of deterioration of the piezoelectric body Qm as compared with an aspect in which the degree of deterioration of the piezoelectric body Qm is decided based on the number of times of discharge. Further, according to the present embodiment, by measuring the heat generation amount of the piezoelectric body Qm, the influence of noise at the time of measurement can be reduced as compared with the aspect in which the displacement of the piezoelectric body Qm is measured, so that the degree of deterioration of the piezoelectric body Qm can be accurately measured.

Further, the liquid discharge device 100 further includes the current supply circuit 81 that supplies a current to the detection resistor TK, and the voltage detection circuit 82 that detects the voltage applied to the detection resistor TK, in which the control section 7 functions as the temperature specifying section 71 that specifies the heat generation temperature in the vicinity of the pressure chamber CV1 based on the current I0 supplied by the current supply circuit 81 and the voltage VK detected by the voltage detection circuit 82, and the decision section 75 decides the degree of deterioration of the piezoelectric body Qm based on the heat generation temperature specified by the temperature specifying section 71.

The decision section 75 can specify the resistance value RK based on the current I0 and the voltage VK. The resistance value RK changes according to the temperature of the detection resistor TK. Therefore, the liquid discharge device 100 according to the first embodiment can accurately specify the heat generation temperature in the vicinity of the pressure chamber CV1 based on the current I0 and the voltage VK.

Further, the decision section 75 decides that the degree of deterioration of the piezoelectric body Qm is the first degree D1 when the heat generation temperature specified by the temperature specifying section 71 is the first temperature T1, and decides that the degree of deterioration of the piezoelectric body Qm is the second degree D2 indicating as deteriorated more than the first degree D1 when the heat generation temperature specified by the temperature specifying section 71 is the second temperature T2 lower than the first temperature T1. As described above, the piezoelectric body Qm has a characteristic that the heat generation amount of the piezoelectric body Qm decreases when the piezoelectric body Qm deteriorates. Therefore, the liquid discharge device 100 according to the first embodiment can accurately specify the degree of deterioration of the piezoelectric body Qm based on the temperature specified by the temperature specifying section 71.

Further, when the temperature specified by the temperature specifying section 71 is the third temperature T3, which is lower than the second temperature T2, the decision section 75 decides that the degree of deterioration of the piezoelectric body Qm is the third degree D3 indicating as deteriorated more than the second degree D2. When the difference between the second temperature T2 and the third temperature T3 is substantially the same as the difference between the first temperature T1 and the second temperature T2, the difference between the second degree D2 and the third degree D3 is larger than the difference between the first degree D1 and the second degree D2.

As described above, the piezoelectric body Qm has a characteristic that the degree of decrease in the heat generation amount of the piezoelectric body Qm becomes gradual as the deterioration of the piezoelectric body Qm progresses. Using the characteristic, for example, in a plurality of temperatures registered in the deterioration characteristic table 65, the first number of temperatures from the first temperature T1 to the second temperature T2 may be set to be less than the second number of temperatures from the second temperature T2 to the third temperature T3. The change in the degree of deterioration of the piezoelectric body Qm is small from the first temperature T1 to the second temperature T2 as compared with the second temperature T2 to the third temperature T3. Therefore, when the first number is made less than the second number, the decision section 75 can reduce the amount of data in the deterioration characteristic table 65 while maintaining the decision accuracy of the degree of deterioration of the piezoelectric body Qm. Furthermore, since the degree of deterioration of the piezoelectric body Qm changes significantly from the second temperature T2 to the third temperature T3 as compared with the first temperature T1 to the second temperature T2, the decision section 75 can accurately specify the degree of deterioration of the piezoelectric body Qm by making the second number larger than the first number.

Further, the decision section 75 decides the degree of deterioration of the piezoelectric body Qm based on the detection result of the detection resistor TK under the deterioration specifying condition.

When the deterioration specifying conditions are different, for example, when the inspection drive waveforms Com-H are different, the heat generation amount of the piezoelectric body Qm is different even when the degree of deterioration of the piezoelectric body Qm is the same. Therefore, the liquid discharge device 100 according to the first embodiment can accurately decide the degree of deterioration of the piezoelectric body Qm based on the detection result of the detection resistor TK under the deterioration specifying condition.

Further, the control section 7 also functions as the determination section 77 that determines the drive signal Com to be applied to the piezoelectric body Qm based on the decision result by the decision section 75.

Since the discharge characteristics are improved by determining the drive signal Com based on the decision result by the decision section 75, the quality of the image formed on the medium PP can be improved as compared with an aspect in which the drive signal Com is determined based on the number of times of discharge.

Further, the liquid discharge device 100 further includes the notification section 9 that notifies the user of information related to the degree of deterioration of the piezoelectric body Qm based on the decision result by the decision section 75.

By notifying the user of the information related to the degree of deterioration of the piezoelectric body Qm, the user can execute an appropriate action corresponding to the information. For example, when the user receives notification of information indicating that "There is a possibility that the piezoelectric element of the liquid discharge head deteriorates and printing is not be performed correctly. Please replace the liquid discharge head", the user can suppress the waste of the medium PP by stopping the execution of the printing process. In addition, when the user receives a notification of the information that "the piezoelectric element of the liquid discharge head deteriorates and the replacement time of the liquid discharge head is approaching", the user prepares the spare liquid discharge head 1. Therefore, when the piezoelectric body Qm deteriorates to the extent that the ink cannot be normally discharged even when the drive signal Com is corrected, the liquid discharge head 1 is replaced, so that the period during which the printing process cannot be executed can be shortened.

In addition, the liquid discharge head 1 further includes the common electrode Qb provided on the surface PL1 far from the pressure chamber substrate 23 in the two surfaces of the piezoelectric body Qm, and the individual electrode Qc provided on the surface PL2 close to the pressure chamber substrate 23 in the two surfaces of the piezoelectric body Qm, in which the detection resistor TK is formed of the same material as the individual electrode Qc. In the present embodiment, the detection resistor TK and the individual electrodes Qc are formed of platinum.

The liquid discharge head 1 according to the first embodiment can suppress an increase in the manufacturing cost of the liquid discharge head 1 due to the provision of the detection resistor TK, as compared to an aspect in which the detection resistor TK and the individual electrode Qc are formed of different materials.

In addition, the detection resistor TK is provided on the surface PL2 of the piezoelectric body Qm.

That is, since the detection resistor TK and the individual electrode Qc are provided in the same layer, the liquid discharge head 1 according to the first embodiment can pattern the detection resistor TK and the individual electrode Qc at the same time. For this reason, according to the liquid discharge head 1 according to the first embodiment, it is possible to suppress the increase in the manufacturing cost of the liquid discharge head 1 due to the provision of the detection resistor TK, as compared to an aspect in which the detection resistor TK and the individual electrode Qc are provided in different layers.

Further, the pressure chamber substrate 23 is further provided with a plurality of pressure chambers CV1, and the liquid discharge head 1 includes a piezoelectric body Qm provided to correspond to each of the plurality of pressure chambers CV1, and an individual electrodes Qc provided in each of the plurality of piezoelectric bodies Qm. The common electrode Qb is provided in common with the plurality of piezoelectric bodies Qm.

Even in an aspect in which the common electrode Qb is the so-called upper electrode and the individual electrode Qc is the so-called lower electrode, the degree of deterioration of the piezoelectric body Qm can be accurately decided. Therefore, according to the first embodiment, the degree of freedom in the configuration of the piezoelectric element PZ can be improved.

2. Modification Example

Each aspect illustrated above can be modified in various ways. Specific modification modes are illustrated below. Two or more aspects randomly selected from the following illustrations can be combined as appropriate within a mutually consistent range.

2.1. First Modification Example

The decision section 75 according to the first embodiment decides the degree of deterioration of the piezoelectric body Qm based on the heat generation temperature specified by the temperature specifying section 71, but the present disclosure is not limited thereto. For example, the amount of charge discharged by the piezoelectric body Qm may be calculated based on the heat generation temperature specified by the temperature specifying section 71, and the decision section 75 may decide the degree of deterioration of the piezoelectric body Qm based on the calculated amount of charge.

Figure 13:
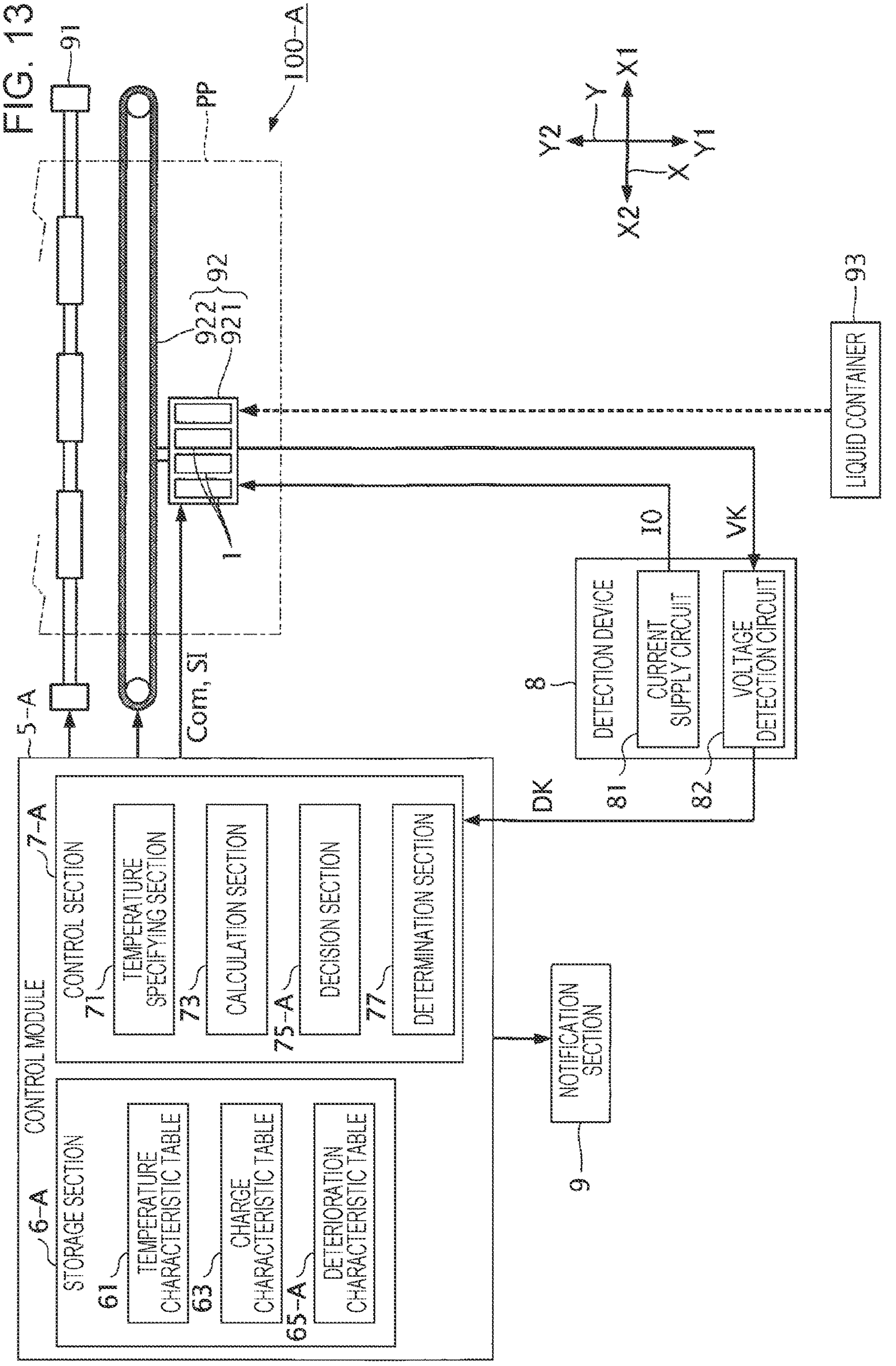
FIG. 13 is a schematic diagram illustrating a liquid discharge device according to a first modification example.

FIG. 13 is a schematic diagram illustrating a liquid discharge device 100-A according to a first modification example. The liquid discharge device 100-A is different from the liquid discharge device 100 in a fact that the liquid discharge device 100-A has a control module 5-A instead of the control module 5. The control module 5-A is different from the control module 5 in a fact that the control module 5-A has a storage section 6-A instead of the storage section 6 and has a control section 7-A instead of the control section 7. The storage section 6-A is different from the storage section 6 in a fact that the storage section 6-A stores a charge characteristic table 63 and has a deterioration characteristic table 65-A instead of the deterioration characteristic table 65. The control section 7-A is different from the control section 7 in a fact that the control section 7-A also functions as a calculation section 73 and further functions as a decision section 75-A instead of the decision section 75.

The calculation section 73 calculates the amount of charge discharged by the piezoelectric body Qm based on the heat generation temperature specified by the temperature specifying section 71. More specifically, the calculation section 73 calculates the amount of charge discharged by the piezoelectric body Qm with reference to the charge characteristic table 63. The charge characteristic table 63 shows a relationship between a plurality of heat generation temperatures that can be specified by the temperature specifying section 71 and the amount of charge discharged by the piezoelectric body Qm corresponding to each of the plurality of heat generation temperatures. The charge characteristic table 63 is generated based on the values obtained from the experience or experiment of the developer of the liquid discharge head 1. For example, when the heat generation temperature specified by the temperature specifying section 71 is registered in the charge characteristic table 63, the calculation section 73 calculates the amount of charge corresponding to the registered heat generation temperature as the amount of charge discharged by the piezoelectric body Qm. On the other hand, when the heat generation temperature specified by the temperature specifying section 71 is not registered in the charge characteristic table 63, the calculation section 73 executes the interpolation process based on the amount of charge corresponding to the heat generation temperature specified by the temperature specifying section 71 among a plurality of amount of charge registered in the charge characteristic table 63, thereby calculating the charge amount discharged by the piezoelectric body Qm.

The decision section 75-A decides the degree of deterioration of the piezoelectric body Qm based on the amount of charge calculated by the calculation section 73. More specifically, the decision section 75-A decides the degree of deterioration of the piezoelectric body Qm with reference to the deterioration characteristic table 65-A. The deterioration characteristic table 65-A shows the relationship between a plurality of amount of charge, which can be acquired by the calculation section 73, and the information indicating the degree of deterioration of the piezoelectric body Qm corresponding to each of the plurality of amount of charge.

As described above, the control section 7-A according to the first modification example also functions as the calculation section 73 that calculates the amount of charge discharged by the piezoelectric body Qm based on the heat generation temperature specified by the temperature specifying section 71, and the decision section 75-A decides the degree of deterioration of the piezoelectric body Qm based on the amount of charge calculated by the calculation section 73.

Similar to the liquid discharge device 100 according to the first embodiment, the liquid discharge device 100-A according to the first modification example can accurately decide the degree of deterioration of the piezoelectric body Qm, as compared with an aspect in which the degree of deterioration of the piezoelectric body Qm is decided based on the number of times of discharge.

2.2. Second Modification Example

In each of the embodiments described above, the detection resistor TK may be provided on the surface PL2 of the piezoelectric body Qm, but may be provided on the surface PL1 of the piezoelectric body Qm.

Figure 14:
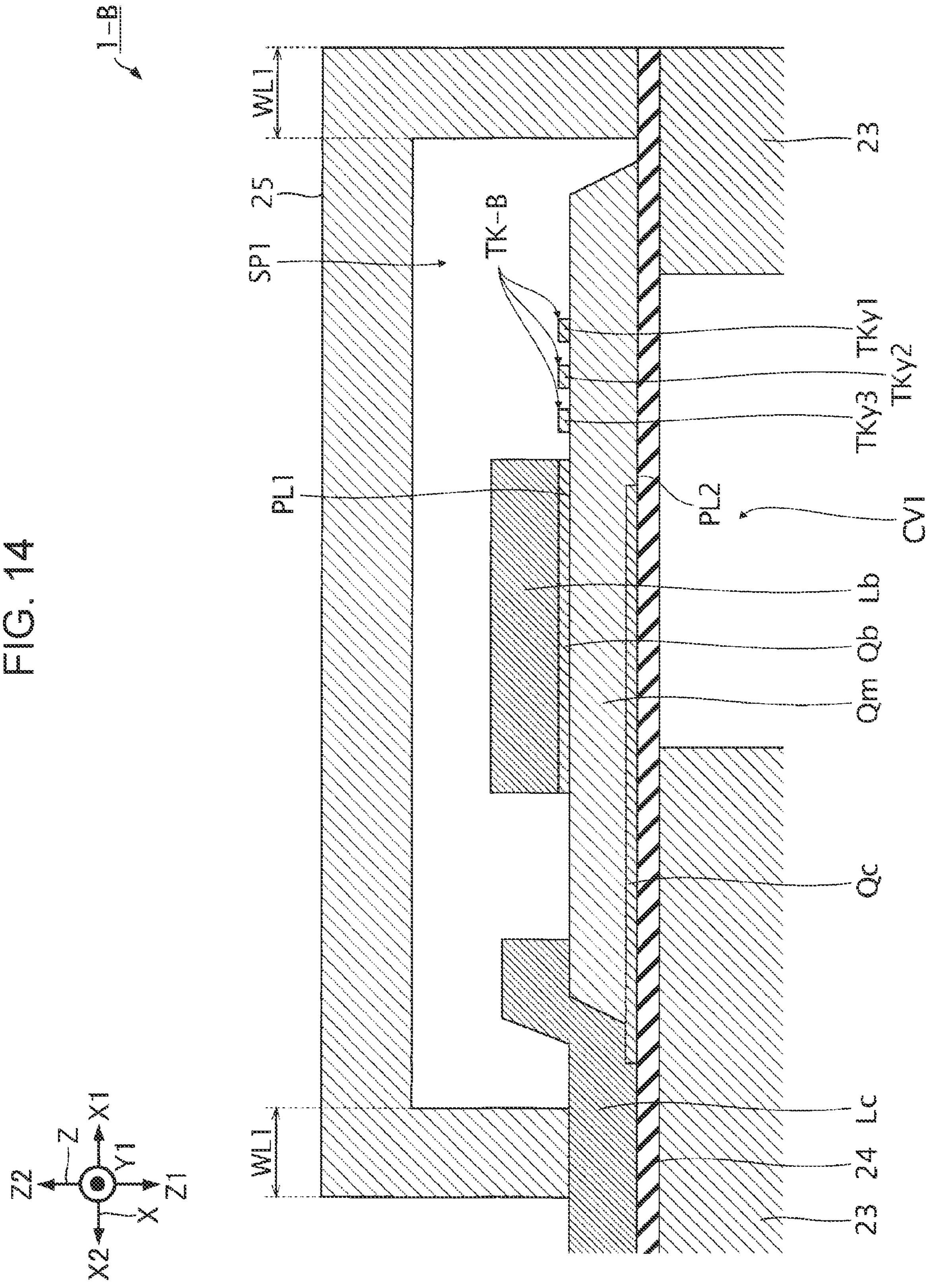
FIG. 14 is a diagram for explaining a liquid discharge head according to a second modification example.

FIG. 14 is a diagram for explaining a liquid discharge head 1-B according to a second modification example. FIG. 14 shows a cross section of the liquid discharge head 1-B taken along line VI-VI in FIG. 4. The liquid discharge head 1-B is different from the liquid discharge head 1 according to the first embodiment in a fact that the liquid discharge head 1-B has a detection resistor TK-B instead of the detection resistor TK.

As shown in FIG. 14, the detection resistor TK-B is provided on the surface PL1. In the second modification example, a case is assumed in which the detection resistor TK-B is formed of the same material as the common electrode Qb.

As described above, in the second modification example, the liquid discharge head 1-B further includes the common electrode Qb provided on the surface PL1 far from the pressure chamber substrate 23 in the two surfaces of the piezoelectric body Qm, and the individual electrode Qc provided on the surface PL2 close to the pressure chamber substrate 23 in the two surfaces of the piezoelectric body Qm, in which the detection resistor TK-B is formed of the same material as the common electrode Qb.

The liquid discharge head 1-B according to the second modification example can suppress an increase in the manufacturing cost of the liquid discharge head 1-B due to the provision of the detection resistor TK-B, as compared to an aspect in which the detection resistor TK-B and the common electrode Qb are formed of different materials.

Further, the detection resistor TK-B is provided on the surface PL1.

That is, in the liquid discharge head 1-B according to the second modification example, the detection resistor TK-B and the common electrode Qb are provided in the same layer, so that the detection resistor TK-B and the common electrode Qb can be simultaneously patterned. For this reason, according to the liquid discharge head 1-B according to the second modification example, it is possible to suppress the increase in the manufacturing cost of the liquid discharge head 1-B due to the provision of the detection resistor TK-B, as compared to an aspect in which the detection resistor TK-B and the common electrode Qb are provided in different layers.

2.3. Third Modification Example

In each of the above-described embodiments, the common electrode Qb is provided on the surface PL1 of the piezoelectric body Qm and the individual electrode Qc is provided on the surface PL2 of the piezoelectric body Qm, but the common electrode Qb may be provided on the surface PL2 and the individual electrode Qc may be provided on the surface PL1.

Figure 15:
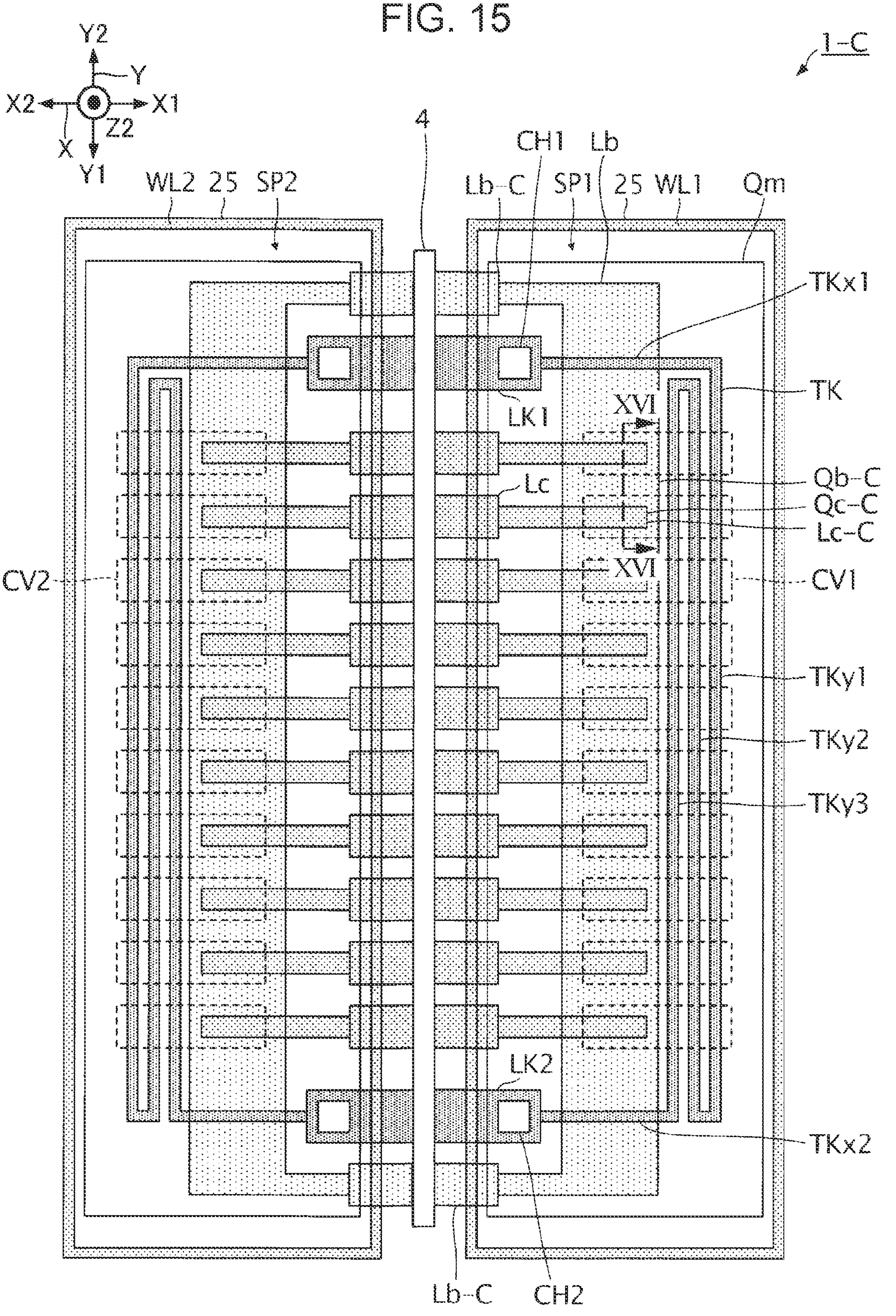
FIG. 15 is a plan view of a liquid discharge head according to a third modification example when the liquid discharge head is viewed from above in the Z1 direction.
Figure 16:
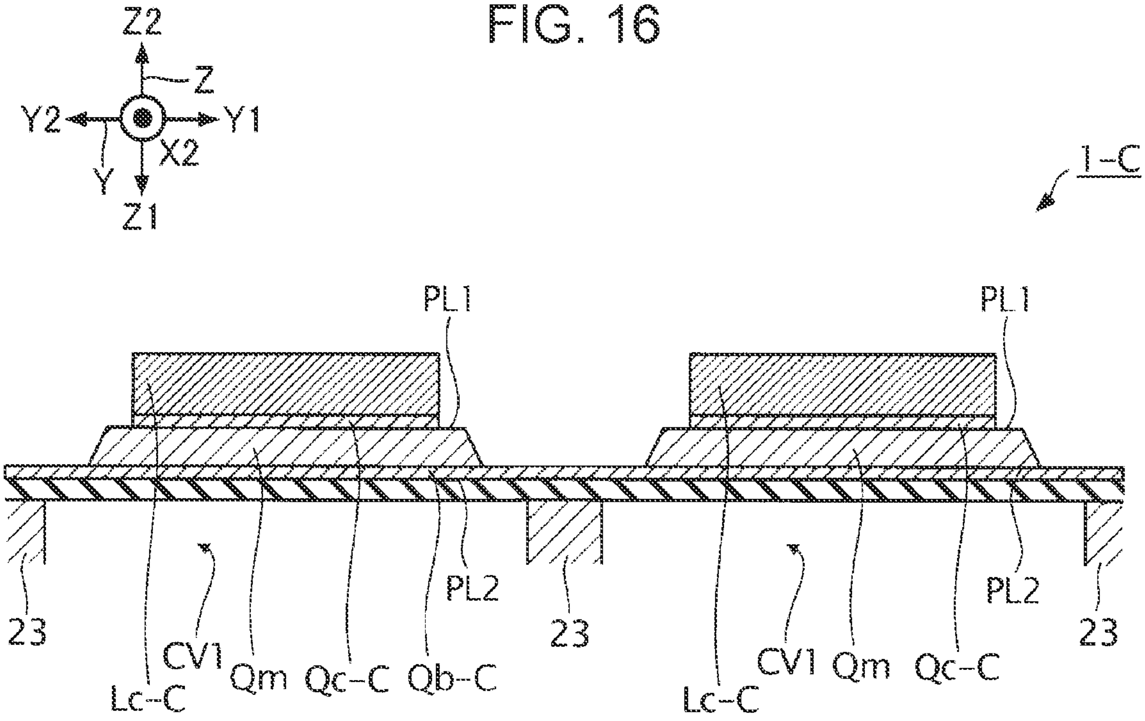
FIG. 16 is a cross-sectional view taken along line XVI-XVI in FIG. 15.

FIG. 15 is a plan view of a liquid discharge head 1-C according to a third modification example when the liquid discharge head 1-C is viewed from above in the Z1 direction. FIG. 16 is a cross-sectional view taken along line XVI-XVI in FIG. 15. The liquid discharge head 1-C is different from the liquid discharge head 1 according to the first embodiment in a fact that the liquid discharge head 1-C has a common electrode Qb-C instead of the common electrode Qb, a common wiring Lb-C instead of the common wiring Lb, a plurality of individual electrodes Qc-C instead of the plurality of individual electrodes Qc, and a plurality of individual wirings Lc-C instead of the plurality of individual wirings Lc.

The common wiring Lb-C is a wiring extending in the X axis direction. One end of the common wiring Lb-C is electrically coupled to the wiring provided on the wiring substrate 4, and the other end is coupled to the common electrode Qb-C. As shown in FIG. 16, the common electrode Qb-C is provided on the surface PL2 of the piezoelectric body Qm. In the third modification example, the common electrode Qb-C is a so-called lower electrode. In the third modification example, the common electrode Qb-C is an example of the "second electrode".

The individual wiring Lc-C is a wiring extending in the X axis direction when the liquid discharge head 1-C is viewed from above in the Z1 direction. One end of the individual wiring Lc-C is electrically coupled to a wiring provided on the wiring substrate 4. The individual electrode Qc-C is provided in a region overlapping the individual wiring Lc-C when the liquid discharge head 1-C is viewed from above in the Z1 direction. The individual electrode Qc-C is coupled to individual wiring Lc-C. As shown in FIG. 16, the individual electrodes Qc-C are provided on the surface PL1 of the piezoelectric body Qm. In the third modification example, the individual electrodes Qc-C is a so-called upper electrode. In addition, in the third modification example, the individual electrode Qc-C is an example of the "first electrode".

As described above, a plurality of pressure chambers CV1 are further provided on the pressure chamber substrate 23 according to the third modification example, and the liquid discharge heads 1-C further includes the piezoelectric body Qm provided to correspond to each of the plurality of pressure chambers CV1, and the individual electrode Qc-C provided for each of the plurality of piezoelectric bodies Qm. The common electrode Qb-C is provided in common with the plurality of piezoelectric bodies Qm.

According to the third modification example, even in an aspect in which the common electrode Qb-C is a so-called lower electrode and the individual electrode Qc-C is a so-called upper electrode, the degree of deterioration of the piezoelectric body Qm can be accurately decided. Therefore, according to the third modification example, the degree of freedom in the configuration of the piezoelectric element PZ can be improved.

2.4. Fourth Modification Example

In each of the above-described aspects, it has been described that the detection result signal DK acquired by the control section 7 has a value indicating the voltage VK as an example of the value corresponding to the voltage VK, but the present disclosure is not limited thereto. For example, the detection result signal DK may have a value indicating the resistance value RK or may have a value indicating a temperature corresponding to the resistance value RK.

2.5. Fifth Modification Example

In each of the above aspects, in order to accurately specify the degree of deterioration of the piezoelectric body Qm, for example, the temperature specifying section 71 may specify ambient temperature before the inspection drive signal Com-H is applied for a predetermined period. "Before the inspection drive signal Com-H is applied for a predetermined period" may be immediately before the inspection drive signal Com-H is applied for a predetermined period, or may be after the power of the liquid discharge device 100 is turned on. The decision section 75 specifies a temperature difference obtained by subtracting the ambient temperature from the temperature specified by the temperature specifying section 71 after applying the inspection drive signal Com-H for a predetermined period as the heat generation amount of the piezoelectric body Qm, and specifies the degree of deterioration of the piezoelectric body Qm based on the temperature difference. The influence of the change in the ambient temperature is excluded from the temperature difference. Therefore, the liquid discharge device 100 according to the fifth modification example can accurately decide the degree of deterioration of the piezoelectric body Qm, as compared with the liquid discharge device 100 according to the first embodiment.

2.6. Sixth Modification Example

In each of the above-described aspects, it is assumed that the inspection drive signal Com-H is applied to all of the plurality of piezoelectric bodies Qm located in the X1 direction from the wiring substrate 4, but the inspection drive signal Com-H may be applied to all the piezoelectric bodies Qm of the liquid discharge head 1. The temperature specifying section 71 specifies the temperatures in the vicinity of the plurality of pressure chambers CV1 and the temperatures in the vicinity of the plurality of pressure chambers CV2, respectively. The decision section 75 decides the degree of deterioration of the piezoelectric body Qm corresponding to the plurality of pressure chambers CV1 and the degree of deterioration of the piezoelectric body Qm corresponding to the plurality of pressure chambers CV2.

The determination section 77 determines the drive signal Com based on the degree of deterioration of the piezoelectric body Qm corresponding to the plurality of pressure chambers CV1 and the degree of deterioration of the piezoelectric body Qm corresponding to the plurality of pressure chambers CV2. For example, the determination section 77 determines the drive signal Com to be applied to all the piezoelectric bodies Qm of the liquid discharge head 1 to be the drive signal Com that can be discharged even by the piezoelectric body Qm in which the deterioration is progressed relatively. According to the aspect, a larger amount of ink is discharged from the nozzle N corresponding to the piezoelectric body Qm in which the deterioration is not progressed relatively, but the ink is discharged from the nozzle N corresponding to the piezoelectric body Qm in which the deterioration is progressed relatively, so that dot omission can be suppressed. When a state in which more ink lands on the medium PP than expected is compared with a state of dot omission, the dot omission is more easily recognized by the user. Therefore, when the determination section 77 determines the drive signal Com such that even the piezoelectric body Qm in which deterioration is progressed relatively can be discharged, the quality of the image formed on the medium PP can be improved as compared with the aspect in which the drive signal Com is determined to the extent that the piezoelectric body Qm in which the deterioration is not progressed relatively can be discharged.

2.7. Seventh Modification Example

In each of the above-described aspects, the temperature in the vicinity of the pressure chamber CV is specified by using the detection resistor TK provided on the surface PL1 or the surface PL2 of the piezoelectric body Qm, but the present disclosure is not limited thereto. For example, in the liquid discharge head 1 according to the seventh modification example may include, instead of the detection resistor TK, a temperature sensor provided completely separately from the piezoelectric body Qm, the common electrode Qb, and the individual electrode Qc in the vicinity of the piezoelectric body Qm, and may specify a temperature measured by the temperature sensor as the temperature in the vicinity of the pressure chamber CV. The temperature sensor is, for example, a thermistor. However, in order to accurately measure the heat generation amount of the piezoelectric body Qm, it is preferable that the temperature sensor is closer to the piezoelectric body Qm. Therefore, the liquid discharge device 100 having the detection resistor TK can accurately specify the degree of deterioration of the piezoelectric body Qm, as compared with the liquid discharge head 1 according to the seventh modification example.

In each of the above-described aspects, the liquid discharge head 1 is provided with the detection resistor TK corresponding to the pressure chamber CV2, that is, the detection resistor TK provided in the X2 direction from the wiring substrate 4 separately from the detection resistor TK corresponding to the pressure chamber CV1, that is, the detection resistor TK provided in the X1 direction from the wiring substrate 4, but the present disclosure is not limited thereto. For example, the detection resistor TK corresponding to the pressure chamber CV1 and the detection resistor TK corresponding to the pressure chamber CV2 may be integrally provided.

Figure 17:
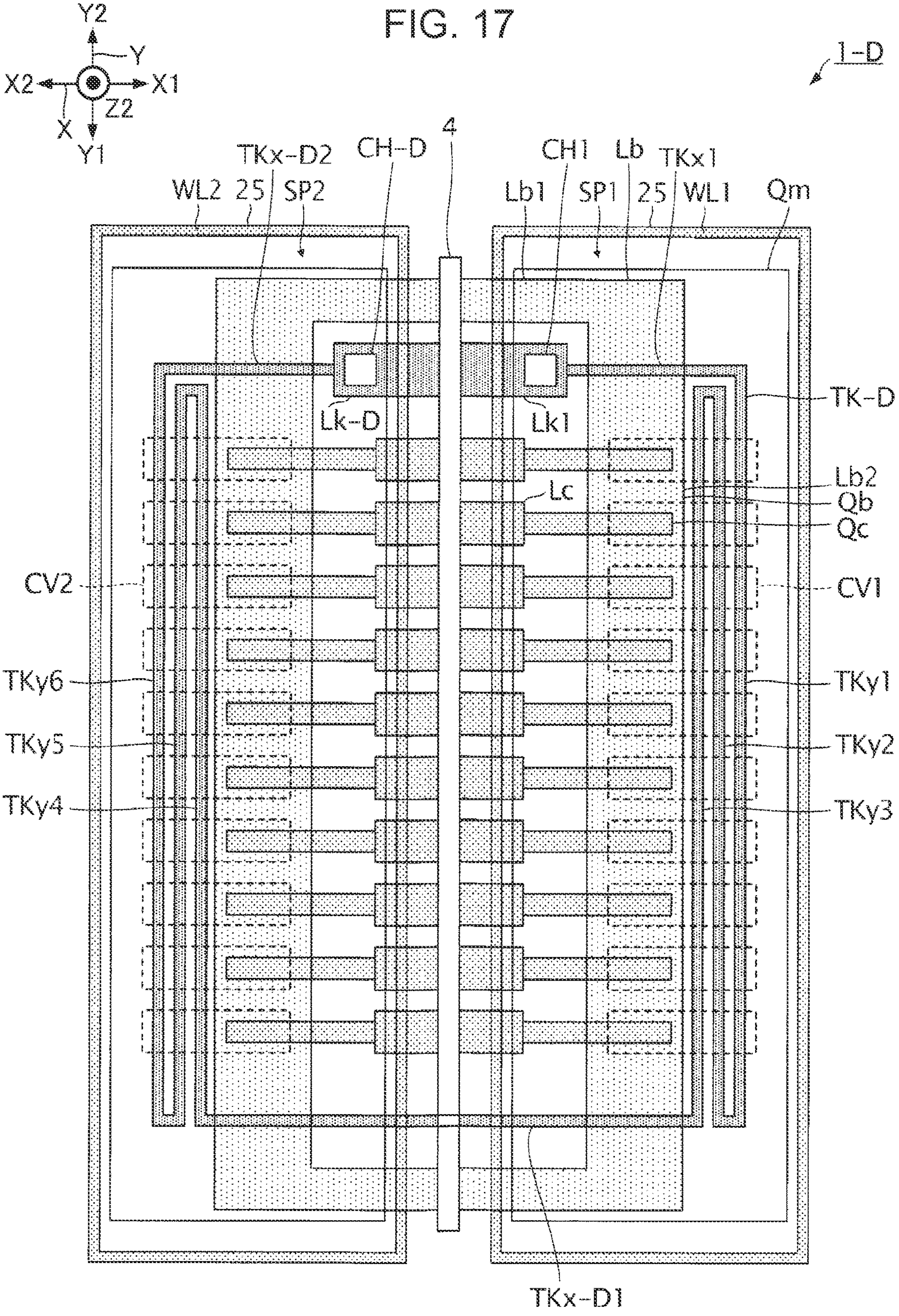
FIG. 17 is a plan view of a liquid discharge head according to a seventh modification example when the liquid discharge head is viewed from above in the Z1 direction.

FIG. 17 is a plan view of a liquid discharge head 1-D when the liquid discharge head 1-D according to a seventh modification example is viewed from above in the Z1 direction.

As illustrated in FIG. 17, the liquid discharge head 1-D is different from the liquid discharge head 1 according to the embodiment shown in FIG. 4 in a fact that the liquid discharge head 1-D includes one detection resistor TK-D instead of the two detection resistors TK including the detection resistor TK corresponding to the pressure chamber CV1 and the detection resistor TK corresponding to the pressure chamber CV2.

The detection resistor TK-D is different from the detection resistor TK according to the embodiment shown in FIG. 4 in a fact that the detection resistor TK-D has an extending part TKx-D1 provided to intersect the wiring substrate 4, an extending part TKy4, an extending part TKy5, an extending part TKy6 that are positioned in the X2 direction from the wiring substrate 4, and an extending part TKx-D2, instead of the extending part TKx2.

The extending part TKx-D1 is provided to intersect the wiring substrate 4 and extend in the X axis direction when the liquid discharge head 1-D is viewed in the Z1 direction, and has one end that is coupled to the extending part TKy3 and the other end that is coupled to the extending part TKy4.

The extending part TKy4 is provided to be line-symmetric with the extending part TKy3 with the wiring substrate 4 as the axis of symmetry, and has one end that is coupled to the extending part TKx-D1 and the other end that is coupled to the extending part TKy5.

The extending part TKy5 is provided to be line-symmetric with the extending part TKy2 with the wiring substrate 4 as the axis of symmetry, and has one end that is coupled to the extending part TKy4 and the other end that is coupled to the extending part TKy6.

The extending part TKy6 is provided to be line-symmetric with the extending part TKy1 with the wiring substrate 4 as the axis of symmetry, and has one end that is coupled to the extending part TKy5 and the other end that is coupled to the extending part TKx-D2.

The extending part TKx-D2 is provided to be line-symmetric with the extending part TKx1 with the wiring substrate 4 as the axis of symmetry, and has one end that is coupled to the extending part TKy6, and the other end that is coupled to the contact hole CH-D of the detection wiring LK-D.

Here, the detection wiring LK-D is provided to be line symmetrical with a detection wiring LK1 with the wiring substrate 4 as the axis of symmetry, and is electrically coupled to the wiring on the wiring substrate 4 set to the ground potential. In addition, the contact hole CH-D is provided to be line symmetrical with the contact hole CH1 with the wiring substrate 4 as the axis of symmetry.

In the present modification example, the current I0 supplied to the detection wiring LK1 flows from the detection wiring LK1 to the wiring on the wiring substrate 4, to which the detection wiring LK-D is electrically coupled, via the extending part TKx1, the extending part TKy1, the extending part TKy2, the extending part TKy3, the extending part TKx-D1, the extending part TKy4, the extending part TKy5, the extending part TKy6, the extending part TKx-D2, and the detection wiring LK-D. Further, the voltage detection circuit 82 according to the present modification example detects the voltage VK-D applied to both ends of the detection resistor TK-D.

In addition, the temperature specifying section 71 according to the present modification example specifies the temperature in the vicinity of the pressure chamber CV based on the voltage VK-D detected by the voltage detection circuit 82.

2.8. Eighth Modification Example

The control section 7 in each of the above-described embodiments functions as the determination section 77 that determines the drive signal Com to be applied to the piezoelectric body Qm based on the decision result, but the control section 7 may not function as the determination section 77. In other words, the control section 7 may not have a function of correcting the drive signal Com.

2.9. Ninth Modification Example

The liquid discharge device 100 according to each of the above-described embodiments has the notification section 9 that notifies the user of information related to the degree of deterioration of the piezoelectric body Qm, but the liquid discharge device 100 may not have the notification section 9.

2.10. Tenth Modification Example

In each of the above-described aspects, the liquid discharge device 100 may communicate with the server. Further, the server may have the functions of the temperature specifying section 71 and the decision section 75.

Figure 18:
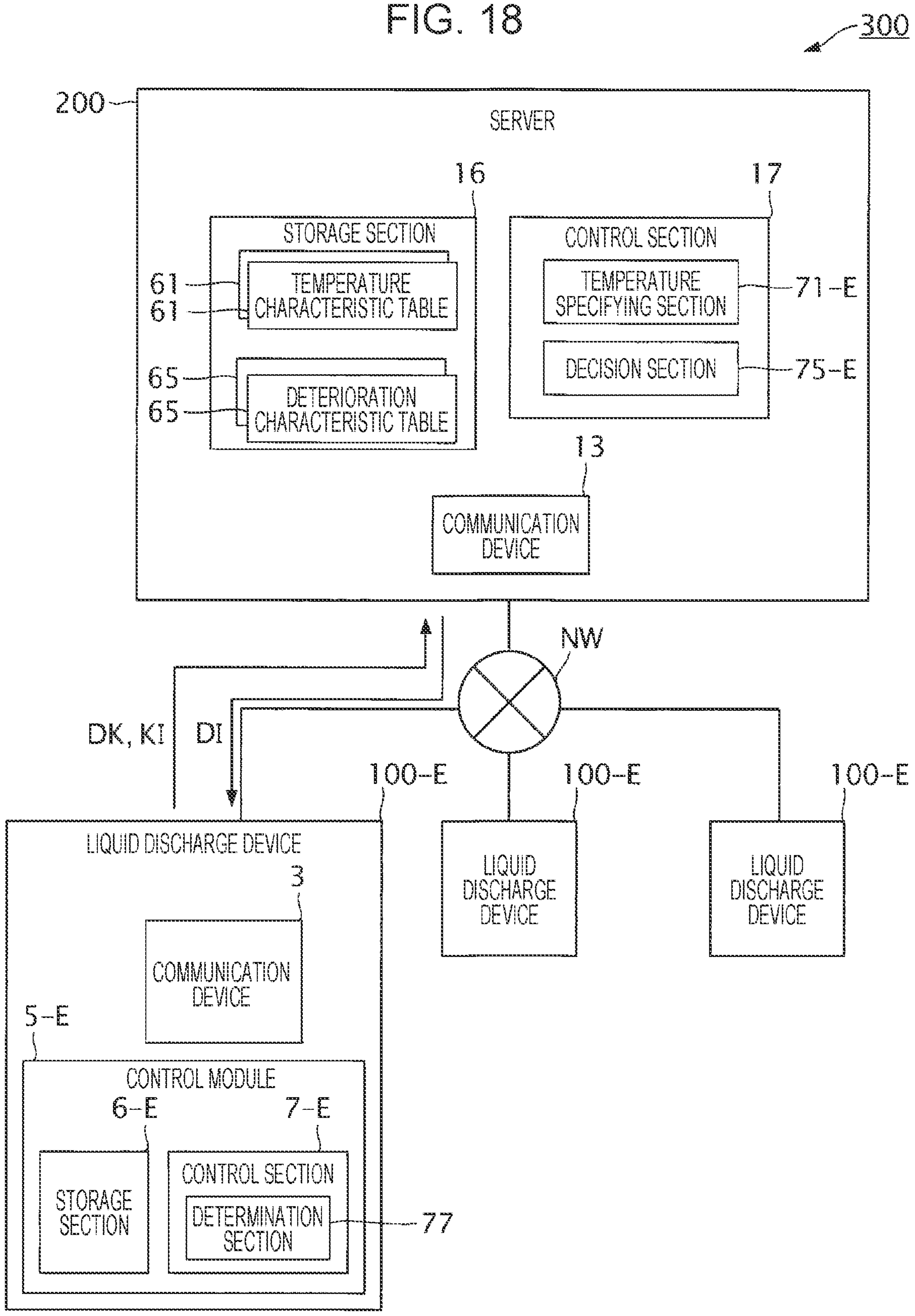
FIG. 18 is a block diagram explaining a system.

FIG. 18 is a block diagram illustrating a system 300. The system 300 provides a service of deciding the degree of deterioration of the piezoelectric body Qm of the liquid discharge device 100-E included in the system 300 to a user of the system 300. The system 300 has the liquid discharge device 100-E and a server 200. In FIG. 18, the number of liquid discharge devices 100-E included in the system 300 is three, but the system 300 may have one liquid discharge device 100-E and a plurality of liquid discharge devices 100-E different from three. When the number of liquid discharge devices 100-E included in the system 300 is plural, the types of the plurality of liquid discharge devices 100-E may be the same or different. Hereinafter, for simplification of the description, the description will be made on the assumption that the number of liquid discharge devices 100-E included in the system 300 is plural and the types of the plurality of liquid discharge devices 100-E are different.

The liquid discharge device 100 and the server 200 are connected by a network NW such as LAN or WAN. LAN is an abbreviation for Local Area Network. WAN is an abbreviation for Wide Area Network.

The liquid discharge device 100-E is different from the liquid discharge device 100 in a fact that the liquid discharge device 100-E has a communication device 3 and has a control module 5-E instead of the control module 5. In FIG. 18, the liquid discharge head 1 and the like are not shown in order to prevent the illustration from being complicated.

The communication device 3 is hardware for performing communication between computers such as the server 200 via at least one of a wired network and a wireless network. The communication device 3 is also called, for example, a network device, a network card, or the like.

The control module 5-E is different from the control module 5 in a fact that the control module 5-E has a storage section 6-E instead of the storage section 6 and has a control section 7-E instead of the control section 7. The storage section 6-E is different from the storage section 6 in a fact that the storage section 6-E does not store the temperature characteristic table 61 and the deterioration characteristic table 65. The control section 7-E is different from the control section 7 in a fact that the control section 7-E does not function as the temperature specifying section 71 and the decision section 75, but functions as the determination section 77.

The server 200 includes a communication device 13, a storage section 16 such as a semiconductor memory, and a control section 17 such as a CPU or an FPGA. The communication device 13 is hardware for performing communication with the liquid discharge device 100-E via at least one of a wired network and a wireless network.

The storage section 16 stores various programs and various data. Further, the storage section 16 has the temperature characteristic table 61 and the deterioration characteristic table 65 for each type of the liquid discharge device 100-E.

The control section 17 can function as the temperature specifying section 71-E and the decision section 75-E.

The operation of the system 300 will be described. When the printing process is executed in any one liquid discharge device 100-EH of the plurality of liquid discharge devices 100-E, the system 300 executes the deterioration specifying process according to the tenth modification example before the printing process.

The control section 7 of the liquid discharge device 100-EH applies the inspection drive signal Com-H to the piezoelectric body Qm for a predetermined period. After the predetermined period elapses, the control section 7 of the liquid discharge device 100-EH acquires the detection result signal DK from the voltage detection circuit 82. The communication device 3 of the liquid discharge device 100-EH transmits the detection result signal DK to the server 200 under the control of the control section 7 of the liquid discharge device 100-EH. In the tenth modification example, the detection result signal DK is an example of "detection information indicating a detection result". Further, the control section 7 of the liquid discharge device 100-EH transmits the type information KI indicating the type of the liquid discharge device 100-EH to the server 200.

The temperature specifying section 71-E specifies a temperature in the vicinity of the pressure chamber CV of the liquid discharge device 100-EH based on the detection result signal DK received from the liquid discharge device 100-EH. More specifically, the temperature specifying section 71-E specifies the temperature characteristic table 61 corresponding to the type of the liquid discharge device 100-EH in the plurality of temperature characteristic tables 61, based on the type information KI received from the liquid discharge device 100-EH. Then, the temperature specifying section 71-E specifies a temperature in the vicinity of the pressure chamber CV of the liquid discharge device 100-EH using the specified temperature characteristic table 61.

Next, the decision section 75-E decides the degree of deterioration of the piezoelectric body Qm of the liquid discharge device 100-EH based on the temperature specified by the temperature specifying section 71-E. More specifically, the decision section 75-E specifies the deterioration characteristic table 65 corresponding to the type of the liquid discharge device 100-EH in the plurality of deterioration characteristic tables 65, based on the type information KI received from the liquid discharge device 100-EH. Then, the decision section 75-E decides the degree of deterioration of the piezoelectric body Qm of the liquid discharge device 100-EH using the specified deterioration characteristic table 65.

The server 200 transmits the decision information DI indicating the degree of deterioration of the piezoelectric body Qm of the liquid discharge device 100-EH to the liquid discharge device 100-EH. The decision information DI is an example of "information indicating a decision result".

The determination section 77 of the liquid discharge device 100-EH determines the drive signal Com to be applied to the piezoelectric body Qm based on the degree of deterioration indicated by the decision information DI received from the server 200. Further, the notification section 9 of the liquid discharge device 100-EH notifies the user of information related to the degree of deterioration of the piezoelectric body Qm based on the degree of deterioration indicated by the decision information DI.

In the tenth modification example, although it is described that the types of the plurality of liquid discharge devices 100-E included in the system 300 are different, the types of the plurality of liquid discharge devices 100-E may be the same. When the types of the plurality of liquid discharge devices 100-E are the same, the storage section 16 stores one temperature characteristic table 61 and one deterioration characteristic table 65. Then, the communication device 3 may not transmit the type information KI to the server 200.

As described above, the system 300 according to the tenth modification example includes the liquid discharge device 100-E that discharges the liquid, and the server 200 that is connected to the liquid discharge device 100-E. The liquid discharge device 100-E includes the liquid discharge head 1 including the pressure chamber substrate 23 that is provided with the pressure chamber CV in which the ink is accommodated, the piezoelectric body Qm that is provided to correspond to the pressure chamber CV, and the detection resistor TK for detecting the temperature in the vicinity of the pressure chamber CV, and the communication device 3 transmitting the detection result signal DK to the server 200, in which the server 200 includes the control section 17 that functions as the decision section 75 which decides the degree of deterioration of the piezoelectric body Qm based on the detection result indicated by the detection result signal DK, and the communication device 13 that transmits the decision information DI indicating the decision result decided by the decision section 75 to the liquid discharge device 100-E.

The system 300 according to the tenth modification example can accurately decide the degree of deterioration of the piezoelectric body Qm as compared with the aspect in which the degree of deterioration of the piezoelectric body Qm is decided based on the number of times of discharge. Further, as compared with the first embodiment, the storage capacity of the storage section 6-E can be reduced since the storage section 6-E may not store the temperature characteristic table 61 and the deterioration characteristic table 65. Further, the processing load on the control section 7 can be reduced since the control section 7-E may not function as the decision section 75.

2.11. Eleventh Modification Example

The storage section 6 according to the first embodiment and any one of the first modification example to the ninth modification example and the storage section 16 according to the tenth modification example have the temperature characteristic table 61 and the deterioration characteristic table. Although it has 65, but may not have the temperature characteristic table 61 and the deterioration characteristic table 65. For example, the temperature specifying section 71 according to the first embodiment and any one of the first modification example to the ninth modification example and the temperature specifying section 71-E according to the tenth modification example specify the temperature in the vicinity of the pressure chamber CV by inputting the resistance value RK based on the detection result signal DK into the function of outputting information indicating the temperature when resistance value RK is input. Similarly, the decision section 75 according to the first embodiment and any one aspect from the first modification example to the ninth modification example and the decision section 75-E according to the tenth modification example decides the degree of deterioration of the piezoelectric body Qm by inputting information indicating the temperature specified by the temperature specifying section 71 or the temperature specifying section 71-E into a function of outputting information indicating the degree of deterioration when the information indicating the temperature is input.

2.12 Twelfth Modification Example

In each of the above-described aspects, the serial-type liquid discharge device 100 in which the storage case 921 is reciprocated in the X axis direction is illustrated, but the present disclosure is not limited to the aspect. The liquid discharge device may be a line-type liquid discharge device in which the plurality of nozzles N are distributed over the entire width of the medium PP.

2.13 Thirteenth Modification Example

The liquid discharge device of each of the above-described aspects can be employed in various types of equipment, such as a facsimile device and a copy machine, in addition to equipment dedicated to printing. However, the application of the liquid discharge device of the present disclosure is not limited to printing. For example, a liquid discharge device that discharges a colorant solution is used as a manufacturing device for forming a color filter of a liquid crystal display device. In addition, a liquid discharge device that discharges a solution of a conductive material is used as a manufacturing device for forming wiring and electrodes of a wiring substrate.

What is claimed is:

1. A liquid discharge device comprising:

a liquid discharge head that includes a pressure chamber substrate provided with a first pressure chamber in which a liquid is accommodated, a first piezoelectric body provided to correspond to the first pressure chamber, and a detection resistor for detecting a temperature in a vicinity of the first pressure chamber; and a decision section that decides a degree of deterioration of the first piezoelectric body based on a detection result of the detection resistor.

2. The liquid discharge device according to claim 1, further comprising:

a current supply circuit that supplies a current to the detection resistor;

a voltage detection circuit that detects a voltage applied to the detection resistor; and a temperature specifying section that specifies a temperature in the vicinity of the first pressure chamber based on the current supplied by the current supply circuit and the voltage detected by the voltage detection circuit, wherein the decision section decides the degree of deterioration of the first piezoelectric body based on the temperature specified by the temperature specifying section.

3. The liquid discharge device according to claim 2, wherein the decision section decides that the degree of deterioration of the first piezoelectric body is a first degree when the temperature specified by the temperature specifying section is a first temperature, and decides that the degree of deterioration of the first piezoelectric body is a second degree indicating as deteriorated more than the first degree when the temperature specified by the temperature specifying section is a second temperature lower than the first temperature.

4. The liquid discharge device according to claim 3, wherein the decision section decides the degree of deterioration of the first piezoelectric body is a third degree indicating as deteriorated more than the second degree when the temperature specified by the temperature specifying section is a third temperature lower than the second temperature, and a difference between the second degree and the third degree is larger than a difference between the first degree and the second degree when a difference between the second temperature and the third temperature is substantially the same as a difference between the first temperature and the second temperature.

5. The liquid discharge device according to claim 2, further comprising:

a calculation section that calculates the amount of charge discharged by the first piezoelectric body based on the temperature specified by the temperature specifying section, wherein the decision section decides the degree of deterioration of the first piezoelectric body based on the amount of charge.

6. The liquid discharge device according to claim 1, wherein the decision section decides the degree of deterioration of the first piezoelectric body based on the detection result of the detection resistor under a predetermined condition.

7. The liquid discharge device according to claim 1, further comprising:

a determination section that determines a drive signal to be applied to the first piezoelectric body based on a decision result by the decision section.

8. The liquid discharge device according to claim 1, further comprising:

a notification section that notifies a user of information related to the degree of deterioration of the first piezoelectric body based on a decision result by the decision section.

9. The liquid discharge device according to claim 1, wherein the liquid discharge head further includes a first electrode that is provided on a first surface far from the pressure chamber substrate in two surfaces of the first piezoelectric body, and a second electrode that is provided on a second surface close to the pressure chamber substrate in two surfaces of the first piezoelectric body, and the detection resistor is formed of the same material as the second electrode.

10. The liquid discharge device according to claim 9, wherein the detection resistor is provided on the second surface.

11. The liquid discharge device according to claim 1, wherein the liquid discharge head further includes a first electrode that is provided on a first surface far from the pressure chamber substrate in two surfaces of the first piezoelectric body, and a second electrode that is provided on a second surface close to the pressure chamber substrate in two surfaces of the first piezoelectric body, and the detection resistor is formed of the same material as the first electrode.

12. The liquid discharge device according to claim 9, wherein the detection resistor is provided on the first surface.

13. The liquid discharge device according to claim 9, wherein the pressure chamber substrate is further provided with a second pressure chamber in which a liquid is accommodated, the liquid discharge head further includes a second piezoelectric body that is provided to correspond to the second pressure chamber, and a third electrode that is provided on the second piezoelectric body, and the first electrode is provided in common to the first piezoelectric body and the second piezoelectric body.

14. The liquid discharge device according to claim 9, wherein the pressure chamber substrate is further provided with a second pressure chamber in which a liquid is accommodated, the liquid discharge head further includes a second piezoelectric body that is provided to correspond to the second pressure chamber, and a third electrode that is provided on the second piezoelectric body, and the second electrode is provided in common to the first piezoelectric body and the second piezoelectric body.

15. A system comprising:

a liquid discharge device that discharges a liquid; and a server that is coupled to the liquid discharge device, wherein the liquid discharge device includes a liquid discharge head that includes a pressure chamber substrate provided with a first pressure chamber in which a liquid is accommodated, a first piezoelectric body provided to correspond to the first pressure chamber, and a detection resistor for detecting a temperature in a vicinity of the first pressure chamber, and a communication device that transmits detection information indicating a detection result of the detection resistor to the server, and the server includes a decision section that decides a degree of deterioration of the first piezoelectric body based on the detection result indicated by the detection information, and a communication device that transmits information indicating a decision result decided by the decision section to the liquid discharge device.

* * * * *